United States Patent
Li et al.

(10) Patent No.: US 7,490,464 B2
(45) Date of Patent: Feb. 17, 2009

(54) EMISSIONS TREATMENT SYSTEM WITH NSR AND SCR CATALYSTS

(75) Inventors: Yuejin Li, Edison, NJ (US); Michel Deeba, East Brunswick, NJ (US); Joseph Charles Dettling, Howell, NJ (US); Joseph Allan Patchett, Basking Ridge, NJ (US); Stanley Allen Roth, Yardley, PA (US)

(73) Assignee: BASF Catalysts LLC, Florham Park, NJ (US)

( * ) Notice: Subject to any disclaimer, the term of this patent is extended or adjusted under 35 U.S.C. 154(b) by 157 days.

(21) Appl. No.: 10/975,428

(22) Filed: Oct. 29, 2004

(65) Prior Publication Data
US 2005/0129601 A1    Jun. 16, 2005

Related U.S. Application Data

(60) Provisional application No. 60/517,137, filed on Nov. 4, 2003.

(51) Int. Cl.
F01N 3/00    (2006.01)

(52) U.S. Cl. .............................. 60/295; 60/274; 60/286; 60/297; 60/301; 60/311

(58) Field of Classification Search .................. 60/274, 60/286, 297, 299, 301, 311, 285; 423/213.2, 423/237, 239.1
See application file for complete search history.

(56) References Cited

U.S. PATENT DOCUMENTS

| | | | | |
|---|---|---|---|---|
| 4,961,917 A | 10/1990 | Byrne | ..................... | 423/239.2 |
| 5,057,483 A | 10/1991 | Wan | ........................... | 502/304 |
| 5,516,497 A | 5/1996 | Speronello et al. | ........... | 423/235 |
| 6,176,079 B1 | 1/2001 | Konrad et al. | ................. | 60/274 |
| 6,216,448 B1 * | 4/2001 | Schnaibel et al. | ............. | 60/274 |
| 6,334,986 B2 * | 1/2002 | Gieshoff et al. | ........... | 423/239.1 |
| 6,338,244 B1 * | 1/2002 | Guenther et al. | ............. | 60/285 |
| 6,699,448 B2 * | 3/2004 | Wu et al. | ................. | 423/239.1 |
| 6,725,647 B2 * | 4/2004 | Pfeifer et al. | ................ | 60/274 |
| 6,753,294 B1 * | 6/2004 | Brisley et al. | ............... | 502/439 |
| 6,766,642 B2 * | 7/2004 | Binder et al. | ................ | 60/301 |

(Continued)

FOREIGN PATENT DOCUMENTS

EP    0 773 354 B1    10/2001

(Continued)

OTHER PUBLICATIONS

U.S. Appl. No. 10/355,779, filed Jan. 31, 2003, Li, Yuejin.

(Continued)

*Primary Examiner*—Thomas E Denion
*Assistant Examiner*—Diem Tran
(74) *Attorney, Agent, or Firm*—Scott S. Servilla; Diehl Servilla LLC; Melanie L. Brown

(57) ABSTRACT

Provided is an emissions treatment system for an exhaust stream, having a NOx storage reduction (NSR) catalyst with a NOx sorbent at a concentration of at least 0.1 g/in³ and a platinum group metal component dispersed on a refractory metal oxide support; and, an SCR catalyst disposed downstream of the NSR catalyst. The emissions treatment system is advantageously used for the treatment of exhaust streams from diesel engines and lean burn gasoline engines.

12 Claims, 14 Drawing Sheets

U.S. PATENT DOCUMENTS

| | | |
|---|---|---|
| 6,777,370 B2 * | 8/2004 | Chen .......................... 502/241 |
| 6,820,415 B2 * | 11/2004 | Abet et al. .................... 60/286 |
| 2003/0056499 A1 | 3/2003 | Binder et al. ................. 60/295 |
| 2004/0040287 A1 | 3/2004 | Beutel et al. ................... 60/285 |
| 2004/0052699 A1 * | 3/2004 | Molinier et al. ............. 422/180 |
| 2004/0076565 A1 | 4/2004 | Gandhi ....................... 423/235 |
| 2004/0182070 A1 | 9/2004 | Goralski, Jr. et al. .......... 60/285 |

FOREIGN PATENT DOCUMENTS

| | | |
|---|---|---|
| EP | 1 147 802 A1 | 10/2001 |
| EP | 1 250 952 A1 | 10/2002 |
| EP | 1 431 534 A1 | 5/2004 |
| FR | 2 822 498 | 9/2002 |
| FR | 2 849 672 | 7/2004 |
| WO | WO 97/17532 | 5/1997 |
| WO | WO 2004/061278 A1 | 7/2004 |
| WO | WO 2004/071646 A3 | 8/2004 |

OTHER PUBLICATIONS

Non-Final Office Action in U.S. Appl. No. 11/748,759 of Sep. 18, 2008, 15 pgs.

* cited by examiner

EMISSIONS TREATMENT SYSTEM WITH NSR AND SCR CATALYSTS

This application claims the benefit of U.S. Provisional No. 60/517,137, filed Nov. 4, 2003.

The present invention relates to emissions treatment systems having NSR and SCR catalysts, and methods useful for reducing contaminants in exhaust gas streams, especially exhaust gas streams containing nitrogen oxides (NOx). More specifically, the present invention is concerned with improved NSR catalysts, emissions treatment systems and methods for their use with lean burn engines, including diesel engines and lean burn gasoline engines.

Operation of lean burn engines, e.g., diesel engines and lean burn gasoline engines, provide the user with excellent fuel economy, and have very low emissions of gas phase hydrocarbons and carbon monoxide due to their operation at high air/fuel ratios under fuel lean conditions. Diesel engines, in particular, also offer significant advantages over gasoline engines in terms of their durability, and their ability to generate high torque at low speed. However, exhaust from lean burn gasoline engines is characterized by relatively high emissions of NOx as compared to conventional gasoline engines that operate at or close to stoichiometric air/fuel conditions. Effective abatement of NOx from lean burn engines is difficult to achieve because high NOx conversion rates typically require reductant-rich conditions. Conversion of the NOx component of exhaust streams to innocuous components generally requires specialized NOx abatement strategies for operation under fuel lean conditions.

One such strategy for the abatement of NOx in the exhaust stream from lean burn engines uses NOx storage reduction (NSR) catalysts, which are also known in the art as "NOx traps." NSR catalysts contain NOx sorbent materials capable of adsorbing or "trapping" oxides of nitrogen under lean conditions and platinum group metal components to provide the catalyst with oxidation and reduction functions. In operation, the NSR catalyst promotes a series of elementary steps which are depicted below in Equations 1-5. In an oxidizing environment, NO is oxidized to $NO_2$ (Equation 1), which is an important step for NOx storage. At low temperatures, this reaction is typically catalyzed by the platinum group metal component, e.g., a platinum component. The oxidation process does not stop here. Further oxidation of $NO_2$ to nitrate, with incorporation of an atomic oxygen, is also a catalyzed reaction (Equation 2). There is little nitrate formation in absence of the platinum group metal component even when $NO_2$ is used as the NOx source. The platinum group metal component has the dual functions of oxidation and reduction. For its reduction role, the platinum group metal component first catalyzes the release of NOx upon introduction of a reductant, e.g., CO (carbon monoxide) or HC (hydrocarbon) (Equation 3) to the exhaust. This step may recover some NOx storage sites but does not contribute to any reduction of NOx species. The released NOx is then further reduced to gaseous $N_2$ in a rich environment (Equations 4 and 5). NOx release can be induced by fuel injection even in a net oxidizing environment. However, the efficient reduction of released NOx by CO requires rich conditions. A temperature surge can also trigger NOx release because metal nitrate is less stable at higher temperatures. NOx trap catalysis is a cyclic operation. Metal compounds are believed to undergo a carbonate/nitrate conversion, as a dominant path, during lean/rich operations.

Oxidation of NO to $NO_2$ $$NO + 1/2 O_2 \rightarrow NO_2 \tag{1}$$

NOx Storage as Nitrate $$2NO_2 + MCO_3 + 1/2 O_2 \rightarrow M(NO_3)_2 + CO_2 \tag{2}$$

NOx Release $$M(NO_2)_2 + 2CO \rightarrow MCO_3 + NO_2 + NO + CO_2 \tag{3}$$

NOx Reduction to $N_2$ $$NO_2 + CO \rightarrow NO + CO_2 \tag{4}$$

$$2NO + 2CO \rightarrow N_2 + 2CO_2 \tag{5}$$

In Equations 2 and 3, M represents a divalent metal cation. M can also be a monovalent or trivalent metal compound in which case the equations need to be rebalanced.

While the reduction of NO and $NO_2$ to $N_2$ occurs in the presence of the NSR catalyst during the rich period, it has been observed that ammonia ($NH_3$) can also form as a by-product of a rich pulse regeneration of the NSR catalyst. For example, the reduction of NO with CO and $H_2O$ is shown below in equation (6).

Reduction of NO to $NH_3$ $$2NO + 5CO + 3H_2O \rightarrow 2NH_3 + 5CO_2 \tag{6}$$

This property of the NSR catalyst mandates that $NH_3$, which is itself a noxious component, must also now be converted to an innocuous species before the exhaust is vented to the atmosphere.

An alternative strategy for the abatement of NOx under development of mobile applications (including treating exhaust from lean burn engines) uses selective catalytic reduction (SCR) catalyst technology. The strategy has been proven effective as applied to stationary sources, e.g., treatment of flue gases. In this strategy, NOx is reduced with a reductant, e.g., $NH_3$, to nitrogen ($N_2$) over an SCR catalyst that is typically composed of base metals. This technology is capable of NOx reduction greater than 90%, thus it represents one of the best approaches for achieving aggressive NOx reduction goals.

Ammonia is one of the most effective reductants for NOx at lean condition using SCR technologies. One of the approaches being investigated for abating NOx in diesel engines (mostly heavy duty diesel vehicles) utilizes urea as a reductant. Urea, which upon hydrolysis produces ammonia, is injected into the exhaust in front of an SCR catalyst in the temperature range 200-600° C. One of the major disadvantages for this technology is the need for an extra large reservoir to house the urea on board the vehicle. Another significant concern is the commitment of operators of these vehicles to replenish the reservoirs with urea as needed, and the requirement of an infrastructure for supplying urea to the operators. Therefore, less burdensome and alternative sources for supplying the reductant $NH_3$ for the SCR treatment of exhaust gases are desirable.

Emissions treatment systems that utilize the catalytic reduction of NOx in the exhaust to generate $NH_3$, in place of an external reservoir of $NH_3$ or $NH_3$ precursor are known in the art. In other words, a portion of the NOx component of the exhaust is used as an $NH_3$ precursor in such systems. For instance, U.S. Pat. No. 6,176,079 discloses a method for treating an exhaust gas from a combustion system that is operated alternately in lean and rich conditions. In the method, nitrogen oxides are intermediately stored during lean operation, and released during rich operation to form $NH_3$ that is stored. The stored $NH_3$ can be released, and thereby reduce nitrogen oxides during a subsequent lean operation.

European Patent Publication No. 773 354 describes a device for purifying the exhaust gas of an engine that has a three way catalyst connected to an $NH_3$ adsorbing and oxidizing ($NH_3$-AO) catalyst. The engine is operated with alternating rich and lean periods. During a rich operation the three way catalyst synthesizes $NH_3$ from NOx in the inflowing exhaust gas, and the $NH_3$ is then adsorbed on the $NH_3$-AO catalyst. During the lean operation NOx passes through the three way catalyst and the adsorbed $NH_3$ is desorbed and reduces the inflowing NOx.

International Published Patent Application WO 97/17532 discloses a method and device for purifying the exhaust gas from an engine, and in particular, describes a method and device for purifying NOx in the exhaust gas. In one embodiment, the publication describes a device that has a three way catalyst upstream of, and on the same carrier as a NOx occluding and reducing catalyst. Downstream of the NOx occluding and reducing (NOx-OR) catalyst is a $NH_3$ adsorbing and oxidation ($NH_3$-AO) catalyst. To prevent any $NH_3$ breakthrough, the device is also equipped with a $NH_3$ purifying catalyst downstream of the $NH_3$-AO catalyst. The air/fuel ratio of the cylinders of the engine are alternately and repeatedly rendered lean and rich to thereby render the exhaust gas air/fuel ratio, alternately and repeatedly rich and lean.

In the method described for this device in the WO97/17532 publication, when the air/fuel ratio of the exhaust gas is lean, NOx passes through the three way catalyst, and NOx is occluded in the NOx-OR catalyst. It is described that any NOx passing through the NOx-OR catalyst is purified in the following $NH_3$-AO catalyst. $NH_3$ is desorbed from the $NH_3$-AO catalyst when the air/fuel ratio of the exhaust gas is lean, and the desorbed $NH_3$ reduces the NOx.

When the air/fuel ratio of the exhaust gas is rich, a part of the NOx in the exhaust gas is converted to $NH_3$ in the three way catalyst. The $NH_3$ then passes into the NOx-OR catalyst, where the NOx is released, reduced and purified by the inflowing $NH_3$. Any $NH_3$ passing through the NOx-OR catalyst that is not consumed by the reduction of NOx is adsorbed on the $NH_3$-AO catalyst, or is purified further downstream in the $NH_3$ purifying catalyst.

A problem associated with methods that utilize a portion of the NOx in the exhaust gas as an $NH_3$ precursor is that, depending on operating conditions, insufficient $NH_3$ is synthesized during rich operating periods to treat the NOx during lean periods (i.e., when the exhaust gas composition has a $\lambda>1$). For instance, in systems that use a three way catalyst to convert NOx to $NH_3$, the maximum amount of $NH_3$ that is formed during a rich period (i.e., when the exhaust gas composition has a $\lambda<1$) is limited by the amount of the NOx component in the exhaust gas. Moreover, when the exhaust gas is rich, the amount of NOx in the exhaust is typically lower than the amount when the exhaust gas is lean. Therefore, less $NH_3$ precursor is available for forming $NH_3$ to treat a higher concentration of NOx that passes through the treatment system in a subsequent lean exhaust period. This deficiency can limit the range of operating conditions where NOx can be effectively treated by the emissions treatment system. Systems that have the capacity to form more $NH_3$ during rich cycles would therefore provide the potential for accommodating a broader range of operating conditions where NOx can be effectively treated.

As the conditions that emission treatment systems operate under vary for different vehicles powered by lean burn engines, flexible approaches for the design of emission treatment systems are needed to achieve ever more stringent requirements for NOx abatement. In particular, approaches that account for the effect on NOx storage and $NH_3$ formation during lean and rich periods of operation of altering the NSR catalyst composition offer more reliable and practical pathways to achieving this goal.

SUMMARY OF THE INVENTION

In one aspect, the invention relates to an emissions treatment system for an exhaust stream from, for example, a diesel engine or a lean burn gasoline engine. The system has a NOx storage reduction (NSR) catalyst with a NOx sorbent at a concentration of at least $0.1$ $g/in^3$ and a platinum group metal component dispersed on a refractory metal oxide support. The emissions treatment system also has an SCR catalyst disposed downstream of the NSR catalyst.

The emissions treatment system typically has a controller to periodically lower the air/fuel ratio in the exhaust stream upstream of the NSR catalyst. In some embodiments, the controller is an engine management system that periodically operates the engine in a rich mode. The controller may also comprise an injector that periodically meters a reducing agent selected from at least one of a hydrocarbon fuel, carbon monoxide and hydrogen into the exhaust stream upstream of the NSR catalyst to form a rich gaseous stream.

The platinum group metal components of the NSR catalyst are generally selected from the group consisting of platinum, palladium, rhodium components and mixtures thereof, and are typically present at from 10 to 250 $g/ft^3$. Preferably, the NSR catalyst has from 50 to 200 $g/ft^3$ of a platinum component.

The NOx sorbent of the NSR catalyst is at least one alkali or alkaline earth metal oxide selected from the oxides of lithium, sodium, potassium, cesium, magnesium, calcium, strontium and barium. Preferably the NOx sorbent includes barium.

The NSR catalyst of the emissions treatment system may further contain an oxygen storage component preferably selected from one or more oxides of lanthanum, cerium, praseodymium and neodymium. If present, there is less than $0.5$ $g/in^3$ of the oxygen storage component present in the NSR catalyst. The oxygen storage component helps to remove sulfur from the NSR catalyst during rich periods and helps to reduce the size and amount particulate matter at the soot filter.

The refractory metal oxide of the NSR catalyst in the emissions treatment system is typically selected from the group consisting of alumina, titania, zirconia, zeolites, ceria dispersed on alumina, titania dispersed on alumina and silica on alumina. In a preferred embodiment, the refractory metal oxide of the NSR catalyst is alumina having a surface area of at least 50 $m^2/g$.

In some preferred embodiments of the emissions treatment system, the NSR catalyst has at least two catalyst layers deposited on a substrate. In other embodiments, the NSR catalyst is a single catalyst layer deposited on a substrate. The substrate can be, for example, a honeycomb flow through substrate or wall flow filter substrate.

One preferred SCR catalyst for the emissions treatment system contains a zeolite component, for instance, an iron- or copper-exchanged zeolite. Another preferred SCR catalyst contains $V_2O_5$, $WO_3$ and $TiO_2$. The SCR catalyst can be deposited on a ceramic or metallic honeycomb flow through substrate. An alternative embodiments, the SCR catalyst may be disposed on a wall flow filter substrate.

In an optional embodiment, the emissions treatment system also has a diesel oxidation-catalyst either upstream of the NSR catalyst or downstream of the SCR catalyst. The diesel oxidation catalyst may be, for example, disposed on a soot filter either upstream of the NSR catalyst or downstream of the SCR catalyst.

A preferred embodiment of the invention relates to an emissions treatment system for an exhaust stream that has a NOx storage reduction (NSR) catalyst with a barium component at a concentration of at least 0.2 to 0.6 $g/in^3$ and a platinum metal component at a concentration of 50 to 200 $g/ft^3$ dispersed on a refractory metal oxide support. This system also has an SCR catalyst disposed downstream of the NSR catalyst, wherein the SCR catalyst comprises an iron-exchanged zeolite material.

In another aspect, the invention relates to a method for converting NOx in an exhaust gas from a diesel engine or lean burn gasoline engine to $N_2$. The method includes:

(a) contacting the exhaust gas comprising NOx in a lean period with a NOx storage reduction (NSR) catalyst comprising a platinum group metal component and at least 0.1 $g/in^3$ of a NOx sorbent dispersed on a refractory metal oxide to sorb a portion of NOx from the exhaust gas and allowing a portion of the NOx to flow through the NSR catalyst untreated;

(b) periodically altering the air/fuel ratio of the exhaust stream to provide a rich gaseous stream during a rich period;

(c) contacting the rich gaseous stream with the NSR catalyst to reduce the sorbed NOx to $NH_3$; and, (d) subsequently contacting a mixture of the $NH_3$ and the untreated NOx in the exhaust gas with an SCR catalyst to form $N_2$.

The method preferably further includes step (c1), which follows step (c). Step (c1) is sorbing a portion of the $NH_3$ on the SCR catalyst.

The alteration of the air/fuel ratio of the exhaust gas stream in (b), may be conducted by periodically operating the engine in a rich mode or by injecting a hydrocarbon fuel into the exhaust gas upstream of the NSR catalyst.

The exhaust gas of (a) generally has a space velocity of 10,000 to 200,000 $h^{-1}$ through the NSR catalyst. Similarly, the exhaust gas of (d) generally has a space velocity of 10,000 to 200,000 $h^{-1}$ through the SCR catalyst.

Preferably, the λ of the rich gaseous stream is from 0.80 to 0.995. During lean periods the λ of the exhaust gas is preferably greater than 1.1. Typically, the rich period is from 1 to 50% of the lean period.

Generally the exhaust gas of (a) has a temperature of 100 to 600° C. through the NSR catalyst. Preferably, the exhaust gas of (a) has a temperature of 150 to 450° C. through the NSR catalyst.

DEFINITIONS

The following terms shall have, for the purposes of this application, the respective meanings set forth below.

"lean gaseous streams" including lean exhaust streams mean gas streams that have a λ>1.0.

"Lean periods" refer to periods of exhaust treatment where the exhaust gas composition is lean, i.e., has a λ>1.0.

"Platinum group metal components" refer to platinum group metals or one of their oxides.

"Rare earth metal components" refer to one or more oxides of the lanthanum series defined in the Periodic Table of Elements, including lanthanum, cerium, praseodymium and neodymium.

"Rich gaseous streams" including rich exhaust streams mean gas streams that have a λ<1.0.

"Rich periods" refer to periods of exhaust treatment where the exhaust gas composition is rich, i.e., has a λ<1.0.

"Washcoat" has its usual meaning in the art of a thin, adherent coating of a catalytic or other material applied to a refractory substrate, such as a honeycomb flow through monolith substrate, which is sufficiently porous to permit the passage there through of the gas stream being treated.

DETAILED DESCRIPTION OF THE INVENTION

The invention relates to an emissions treatment system effective for the treatment of the components of exhaust gases from lean burn engines including unburned gaseous hydrocarbons, can monoxide, particulate matter (e.g., in diesel exhaust) and especially, NOx. The system has an upstream NSR catalyst with dual catalytic function and a downstream SCR catalyst, and is operated with alternating lean and rich exhaust gases. The NSR catalyst promotes the storage of NOx during a lean period of operation according to equations (1) and (2), and during a rich period it catalyzes not only the reduction of stored NOx to $N_2$ (equation 5), but also the formation of $NH_3$ from both gaseous NOx and stored NOx (equation 6). Applicants have recognized that through selection of NSR catalyst components and their respective concentrations in the NSR catalyst compositions, sufficient and predictable quantities of $NH_3$ are formed when the exhaust gas is rendered rich to effectively treat NOx when the exhaust gas is lean. The approaches described herein offer a flexible, efficient and predictable approach for designing emissions treatment systems capable of accommodating exhaust gases emitted from a variety of lean burn engines, including diesel engines and lean burn gasoline engines.

Figure 1A:
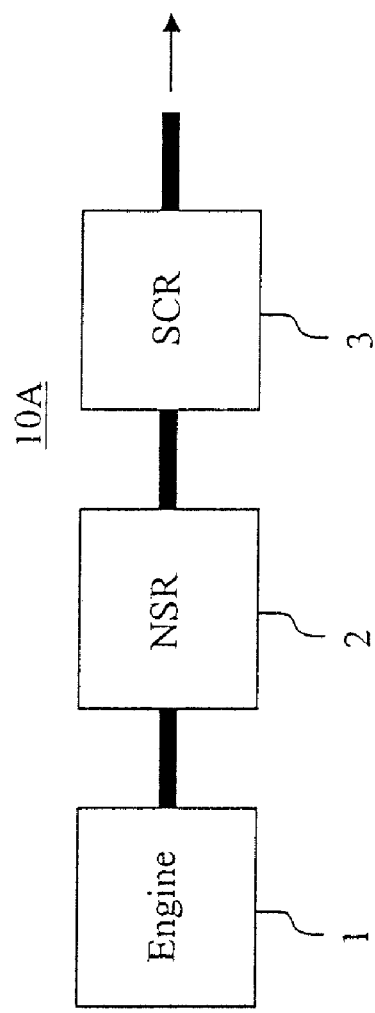
FIG. 1A is a block diagram showing one embodiment of the emissions treatment system having NSR and SCR catalysts.

One embodiment of the emissions treatment system, denoted as 10A in FIG. 1A, includes an NSR catalyst that is upstream of an SCR catalyst. The NSR catalyst can be in the form of an NSR catalyst composition on a refractory ceramic or metallic substrate. In a lean period, an exhaust gas composition flowing from the exhaust manifold of an engine 1 contacts the NSR catalyst 2 where a portion of the NOx contained therein is adsorbed on to the NSR catalyst, and another portion of the NOx passes through NSR catalyst untreated. The air/fuel ratio of the exhaust gas composition is then altered to render a rich gaseous stream during a rich period. The rich gaseous stream then contacts the NSR catalyst to reduce the sorbed NOx to $N_2$ and $NH_3$. The amount of $NH_3$ so produced can therefore be greater than the engine out NOx emission. In addition, gaseous NOx in the rich stream is also reduced to provide further quantities of $NH_3$. The $NH_3$ then passes downstream in the system to an SCR catalyst 3. The SCR catalyst can be in the form of an SCR catalyst composition disposed on a refractory ceramic or metallic substrate. Typically, a portion of the $NH_3$ is adsorbed on to the SCR catalyst. The untreated NOx then contacts the SCR catalyst and reacts with the stored $NH_3$ to form $N_2$ during the lean period.

In alternative embodiments, the NSR and SCR catalysts may be disposed in separate zones on the same substrate, where the NSR catalyst is disposed on the upstream segment of the substrate, and the SCR catalyst is disposed on the downstream segment.

The use of the NSR catalysts described herein provides a significant advantage for the design of emissions treatment systems for lean burn engines. As the NSR catalyst has both a NOx storage function during lean periods of operation and an $NH_3$ generating function during rich periods of operation, inclusion of separate catalyst substrates to perform these two functions is unnecessary. As a consequence, the burden of preparing and housing separate catalyst substrates is absent. Moreover, overall platinum group metal usage is diminished with the dual function NSR catalyst; since catalysts that promote NOx storage and catalysts that promote $NH_3$ formation both generally have platinum group metal components in their compositions. Emissions treatment systems that have a single NSR catalyst instead of separate catalysts for NOx storage and $NH_3$ formation therefore can afford the system designer with significant cost savings.

The air/fuel ratio of the exhaust gas composition may be altered to provide a rich gaseous stream by a number of methods known to those of skill in the art. Controllers that periodically operate the lean burn engine in a rich mode, or more directly alter the air/fuel ratio of the exhaust stream can be used. For instance, the air/fuel ratio can be made rich by periodically operating the engine in a rich mode using well known engine management controls. Alternatively, the exhaust gas stream may be rendered rich by periodically metering a hydrocarbon fuel (e.g., diesel fuel) upstream of the NSR catalyst. A rich gaseous exhaust stream may also be formed by adding CO and $H_2$ to the exhaust upstream of the NSR catalyst, which may be generated, for example, by treatment of a small quantity of hydrocarbon fuel in a partial oxidation reaction.

The amount of $NH_3$ produced during a rich period depends both on the length and intensity of the rich pulse use to generate the rich gaseous stream. For purposes of operating the emissions treatment system of the invention during a rich period, the rich gaseous stream generally has a λ of from 0.80 to 0.995. Preferably, the rich gaseous stream has a λ of from 0.90 to 0.95. During a lean period, the lean gaseous stream preferably has a λ>1.1. The length of the rich period is generally 1 to 50% of the lean period. More preferably, the length of the rich period is 2 to 10% of the lean period. Such operating parameters ensure that adequate levels of $NH_3$ are generated with minimum fuel penalty.

Space velocities for treating NOx with the inventive emissions treatment system through the NSR catalyst are from 10,000 to 200,000 $h^{-1}$. More preferably, the space velocity of the exhaust gas is from 10,000 to 100,000 $h^{-1}$. Similarly, the space velocities of the exhaust gas through the SCR catalyst are preferably from 10,000 to 200,000 $h^{-1}$, and more preferably, from 10,000 to 100,000 $h^{-1}$.

NSR Catalyst Composition

The NSR catalyst composition used in the inventive system contains a NOx sorbent and a platinum group metal component dispersed on a refractory metal oxide support. In addition, the NSR composition optionally contains other components such as oxygen storage components and iron components that significantly affect the quantity of $NH_3$ formed during a rich period of operation. Such compositions are similar to those disclosed in co-pending U.S. patent application Ser. No. 10/355,779, filed Jan. 31, 2003 which is incorporated herein by reference. Such NSR compositions exhibit good NOx storage/NOx reduction activity at exhaust temperature of 100 to 600° C., and more particularly, at temperatures of 150 to 450° C. In addition, such NSR catalyst compositions exhibit outstanding thermal stability and the ability to remove sulfur compounds under moderate conditions.

The NSR catalyst may take any form such as self-supporting particles (e.g., tablets, beads) or as a solid honeycomb monolith formed of the catalyst composition. However, the NSR catalyst composition is preferably disposed as a washcoat or as a combination of washcoats (to form a layered catalyst composite) on a ceramic or metallic substrate. In preferred embodiments of the invention the NSR catalyst is either in the form of a single layer, or a bi-layer catalyst composite with the bottom layer adhered to the substrate and the top layer overlying to the bottom layer.

The support for the NSR catalyst composition is composed of a high surface area refractory metal oxide such as alumina, titania, zirconia; mixtures of alumina with one or more of titania, zirconia and ceria; ceria coated on alumina or titania coated on alumina. The refractory metal oxide may consist of, or contain a mixed oxide such as silica-alumina, aluminosilicates which may be amorphous or crystalline, alumina-zirconia, alumina-chromia, alumina-ceria and the like. The preferred refractory metal oxides are gamma alumina, ceria coated on alumina and titania coated on alumina.

Typically, the refractory metal oxide will have a specific surface area of about 50 to about 300 $m^2/g$. The support is typically present in an amount of about 0.5 to about 3.0 $g/in^3$, this amount being the total amount in embodiments with two or more catalyst layers. In embodiments of the invention where there are two layers, the support chosen for the bottom layer need not be, but is conveniently, the same as that chosen for the top layer. Moreover, the amount of the support in the bottom layer need not be the same as that in the top layer, so long as the amounts of the supports in the bottom and top layers are within the foregoing range.

Dispersed on the refractory metal oxide support will be one or more platinum group metal components, e.g., platinum, palladium, rhodium and mixtures thereof; preferably, the precious metal component comprises platinum. These components of the NSR catalyst promote oxidation and reduction of nitrogen species. The amount of loading of the platinum group metal component will be in the range of about 10 to about 250 $g/ft^3$, and preferably, the amount will be in the range of 50 to 200 $g/ft^3$, these amounts being the total amount in embodiments with two or more catalyst layers. Here again, in embodiments of the invention where a bi-layer catalyst composite is used, the platinum group metal component chosen for the bottom layer need not be, but is conveniently, the same as that chosen for the top layer. Moreover, the amount of the platinum group metal component in the-bottom layer need not be the same as that in the top layer, so long as the amounts of the platinum group metal components in the bottom and top layers are within the foregoing range.

For the purposes of the present invention, the NSR catalyst also contains at least one NOx sorbent component to ensure an adequate NOx storage capacity. In addition, the NOx storage capacity significantly affects the ability of the NSR catalyst to form $NH_3$, since the formation of $NH_3$ during a rich period of operation is in part limited by the supply of stored NOx (i.e., as a metal nitrate). Typically, the NOx sorbent component is present in an amount of at least 0.1 $g/in^3$, such as from 0.1 to 1.0 $g/in^3$ to ensure adequate NOx storage. More preferably there is at least about 0.2 $g/in^3$ of NOx sorbent, and still more preferably at least 0.3 $g/in^3$ of NOx sorbent in the composition. A suitable NOx sorbent component comprises a basic oxygenated compound of an alkali or alkaline earth metal; the alkali metal may be lithium, sodium, potassium or cesium, and the alkaline earth metal may be magnesium, calcium, strontium or barium. The preferred alkali metal comprises potassium, while the preferred alkaline earth metal comprises barium.

In embodiments of the invention where the NSR catalyst is formed as a bi-layer catalyst composite, it is preferred that the NOx sorbent component in the bottom layer is present in an amount greater than about 0.3 $g/in^3$ and that the NOx sorbent in the top layer is present in the amount of 0.0 to less than about 0.3 $g/in^3$. Amounts of the NOx sorbent component in the top layer in amounts higher than about 0.3 $g/in^3$ or greater may have a deleterious effect on the capability of the platinum group metal components to catalyze the oxidation of hydrocarbons and carbon monoxide to carbon dioxide.

An optional component of the NSR catalyst composition that affects the quantity of $NH_3$ that forms are oxygen storage components which typically are formed from rare earth metal components. While oxygen storage components improve the desulfation capacity of the composition (which may be important for some diesel applications), too great a concentration of the oxygen storage composition limits the quantity of $NH_3$ that can be formed during rich operation. While not wishing to be bound to any specific theory, Applicants believe that the presence of oxidized species of the oxygen storage component results in oxidation of $NH_3$ to NOx or $N_2O$ during a rich period, thereby limiting the quantity of $NH_3$ that is ultimately formed by the NSR catalyst. The amount of the oxygen storage component is therefore less than 0.5 $g/in^3$ and preferably, less than 0.35 $g/in^3$.

The oxygen storage component contains at least one oxide of a metal selected from the group consisting of rare earth metal components and most preferably a cerium or praseodymium component, with the most preferred oxygen storage component being cerium oxide (ceria). The oxygen storage component may be dispersed on the refractory metal oxide support by, for example, dispersing a soluble precursor (e.g., cerium nitrate) on the refractory metal oxide support. Alternatively, the oxygen storage component is provided in bulk form in the composition. By bulk form it is meant that a composition is in a solid, preferably as fine particles which can be as small as 1 to 15 microns in diameter or smaller, as opposed to being dispersed in solution in the base metal washcoat. When praseodymium is used, it is preferably used in combination with ceria.

In some embodiments, the oxygen storage component may be composed of a bulk fine particulate material of co-formed rare earth metal-zirconia composite (e.g., a ceria-zirconia composite) such as are commercially available or are readily apparent to those of skill in the art. For instance, co-formed composites are described in U.S. Pat. No. 5,057,483. These particles do not react with stabilized alumina washcoat and maintain a BET surface area of above 40 $m^2/g$ upon exposure to 900° C. for a long period of time. For purposes of calculating the amount of oxygen storage component added in the NSR catalyst composition, the proportion of the rare earth component (e.g., ceria) of the composite material is the relevant component.

An iron component is another optional component that affects the quantity of $NH_3$ that is formed by the NSR catalyst during a rich period. In particular, inclusion of an iron component increases the quantity of $NH_3$ formed over similar NSR compositions where an iron component is absent. If present, the concentration of the iron component in the NSR catalyst is typically present at 0.05 to 0.3 $g/in^3$, and is preferably present at 0.1 to 0.2 $g/in^3$.

Other components that may be added to the NSR composition include other transition metals such as zirconium, manganese, yttrium and titanium. If used, such transition metal components are typically present in an amount of about 0.01 to about 0.5 $g/in^3$.

The NSR catalyst composite of the present invention may be readily prepared by processes well known in the prior art. A representative process for preparing a bi-layer NSR catalyst is set forth below.

The catalyst composite can be readily prepared in layers on a monolithic honeycomb substrate. For the bottom layer, finely divided particles of a high surface area refractory metal oxide such as gamma alumina are slurried in an appropriate vehicle, e.g., water. The substrate may then be dipped one or more times in such slurry or the slurry may be coated on the substrate (e.g., honeycomb flow through substrate) such that there will be deposited on the substrate the desired loading of the metal oxide, e.g., about 0.5 to about 3.0 $g/in^3$. Components such as the platinum group metals, transition metal oxides, stabilizers, promoters and the NOx sorbent component may be incorporated in the slurry as a mixture of water soluble or water-dispersible compounds or complexes. Thereafter the coated substrate is calcined by heating, e.g., at 400 to 600° C. for 1 to 3 hours.

Typically, the platinum group metal component, e.g., platinum component, is dispersed on the refractory metal oxide, e.g., activated alumina, using a platinum group metal salt or complex (or platinum group metal precursor). For the purposes of the present invention, the term "platinum group metal precursor" means any compound, complex, or the like which, upon calcination or use thereof, decomposes or otherwise converts to a catalytically active form, usually the metal or the metal oxide. Water-soluble compounds or water-dispersible compounds or complexes of the metal component may be used as long as the liquid medium used to impregnate or deposit the metal component onto the refractory metal oxide support particles does not adversely react with the metal or its compound or its complex or other components which may be present in the catalyst composition and is capable of being removed from the metal component by volatilization or decomposition upon heating and/or application of a vacuum. In some cases, the completion of removal of the liquid may not take place until the catalyst is placed into use and subjected to the high temperatures encountered during operation. Generally, both from the point of view of economics and environmental aspects, aqueous solutions of soluble compounds or complexes of the platinum-group metals are preferred. For example, suitable compounds are chloroplatinic acid, amine-solubilized platinum hydroxide, palladium nitrate or palladium chloride, rhodium chloride, rhodium nitrate, hexamine rhodium chloride, etc. During the calcination step, or at least during the initial phase of use of the composite, such compounds are converted into a catalytically active form of the metal or a compound thereof.

A preferred method of forming the bottom layer of the layered catalyst composite of the invention is to prepare a mixture of a solution of a platinum group metal precursor and at least one finely divided, high surface area, refractory metal oxide support, e.g., gamma alumina, which is sufficiently dry to absorb substantially all of the solution to form a slurry. Preferably, the slurry is acidic, having a pH of about 2 to less than 7. The pH of the slurry may be lowered by the addition of a minor amount of an inorganic or organic acid such as hydrochloric or nitric acid, preferably acetic acid, to the slurry. Thereafter, the NOx sorbent component, and optional transition metal components, stabilizers and/or promoters may be added to the slurry.

In a particularly preferred embodiment, the slurry is thereafter comminuted to result in substantially all of the solids having particle sizes of less than 20 microns, i.e., 1-15 microns, in an average diameter. The comminution may be conducted in a ball mill or other similar equipment, and the solids content of the slurry may be, e.g., 20-60 wt. %, preferably 35-45 wt. %.

The top layer is thereafter prepared and deposited on the bottom layer of the calcined composite in a manner similar to that described above. After all coating operations have been completed, the composite is then again calcined by heating, e.g., at 400 to 600° C. for 1-3 hours.

SCR Catalyst

The emissions treatment system can use a number of known SCR catalysts to treat NOx downstream of the NSR catalyst. For instance, base metal (e.g., copper, iron) exchanged zeolite compositions or vanadia-based compositions (e.g., $V_2O_5/WO_3/TiO_2/SiO_2$) can be used to form the SCR catalyst. The SCR catalyst can be in the form of self supporting catalyst particles or as a honeycomb monolith formed of the SCR catalyst composition. In preferred embodiments of the invention however, the NSR catalyst composition is disposed as a washcoat or as a combination of washcoats on a ceramic or metallic substrate, preferably a honeycomb flow through substrate.

In a preferred embodiment of the emissions treatment system the SCR catalyst is formed from a base metal exchanged zeolite material. Such SCR catalyst compositions are described, for example, in U.S. Pat. Nos. 4,961,917 (the '917 patent) and 5,516,497, which are both hereby incorporated by reference in their entirety. Compositions disclosed in the '917 patent include one or both of an iron and a copper promoter present in a zeolite in an amount of from about 0.1 to 30 percent by weight, preferably from about 1 to 5 percent by weight, of the total weight of promoter plus zeolite. In a preferred embodiment, the zeolite includes an iron component.

Zeolites used in such compositions are resistant to sulfur poisoning and sustain a high level of activity for the SCR process. These zeolites have pore size large enough to permit adequate movement of the reactant molecules NO and $NH_3$ in to, and the product molecules $N_2$ and $H_2O$ out of, the pore system in the presence of sulfur oxide molecules resulting from short term sulfur poisoning, and/or sulfate deposits resulting from long term sulfur poisoning. The pore system of suitable size is interconnected in all three crystallographic dimensions. As is well known to the those skilled in the zeolite art, the crystalline structure of zeolites exhibits a complex pore structure having more or less regularly recurring connections, intersections and the like. Pores having a particular characteristic, such as a given dimension diameter or cross-sectional configuration, are said to be one dimensional if those pores do not intersect with other like pores. If the pores intersect only within a given plane with other like pores, the pores of that characteristic are said to be interconnected in two (crystallographic) dimensions. If the pores intersect with other like pores lying both in the same plane and in other planes, such like pores are said to be interconnected in three dimensions, i.e., to be "three dimensional." It has been found that zeolites which are highly resistant to sulfate poisoning and provide good activity for the SCR process, and which retain good activity even when subject to high temperatures, hydrothermal conditions and sulfate poisons, are zeolites which have pores which exhibit a pore diameter of at least about 7 Angstroms and are interconnected in three dimensions. Without wishing to be bound by any specific theory, it is believed that the interconnection of pores of at least 7 Angstroms diameter in three dimensions provides for good mobility of sulfate molecules throughout the zeolite structure, thereby permitting the sulfate molecules to be released from the catalyst to free a large number of the available adsorbent sites for reactant NOx and $NH_3$ molecules.

In preferred embodiments of the invention, the zeolites have a Si/Al ratio of at least 2.5, and more preferably of at least 10. Any zeolites meeting the foregoing criteria are suitable for use in the practices of the present invention; specific zeolites which meet these criteria are Beta, ZSM-5, ZSM-11, dealuminated Y, and dealuminated mordenite. Other zeolites may also satisfy the aforementioned criteria.

When deposited on the honeycomb monolith substrates, such SCR catalyst compositions are deposited at a concentration of at least 1.3 $g/in^3$ to ensure that the desired NOx reduction is achieved and to secure adequate durability of the catalyst over extended use. In a preferred embodiment, there is at least 1.6 $g/in^3$ of SCR composition, and in particular, there is at least 1.6 to 2.4 $g/in^3$ of the SCR composition disposed on the wall flow monolith.

Substrates

Figure 13:
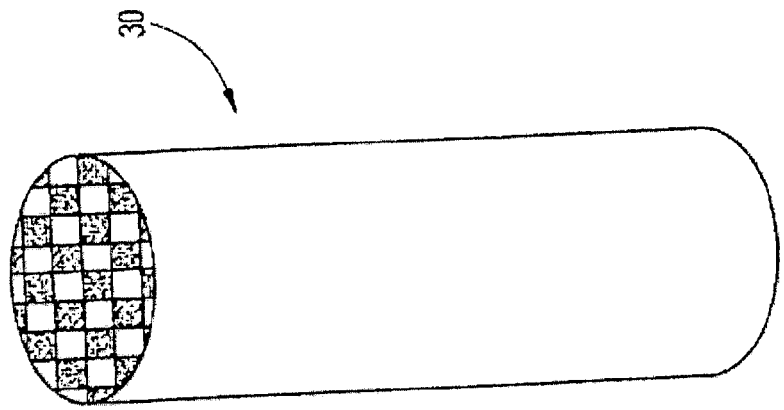
FIG. 13 shows a schematic view in perspective of one embodiment of an emissions treatment system.
Figure 14:
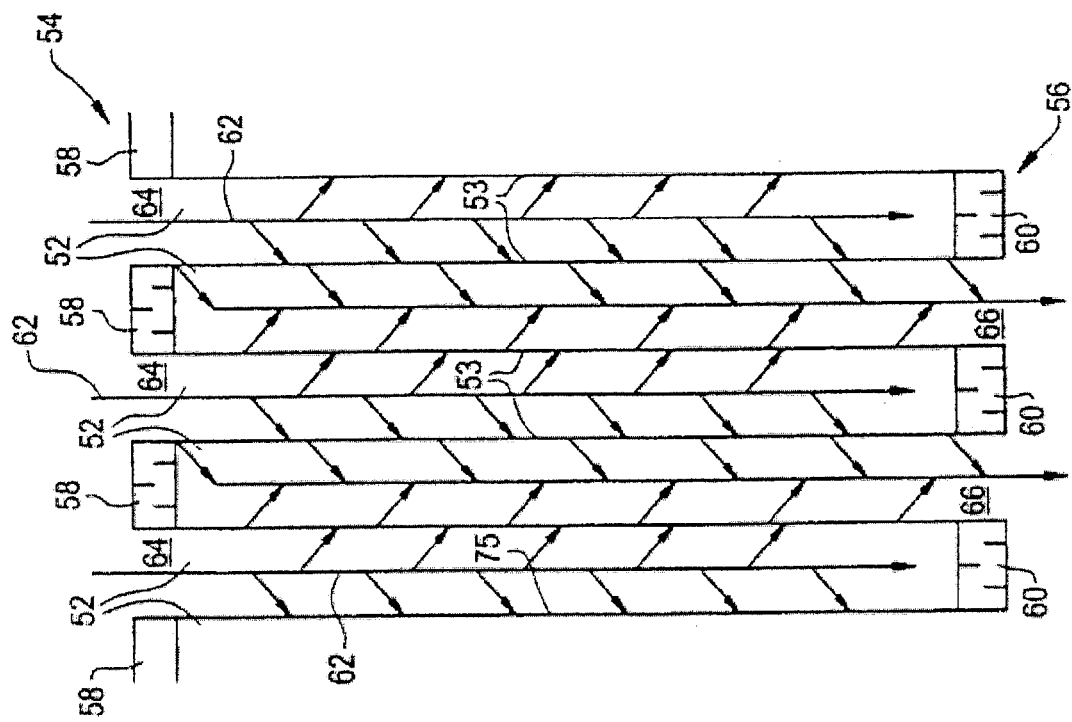
FIG. 14 shows a partial, sectional section view of one embodiment of an emissions treatment system.
Figure 15:
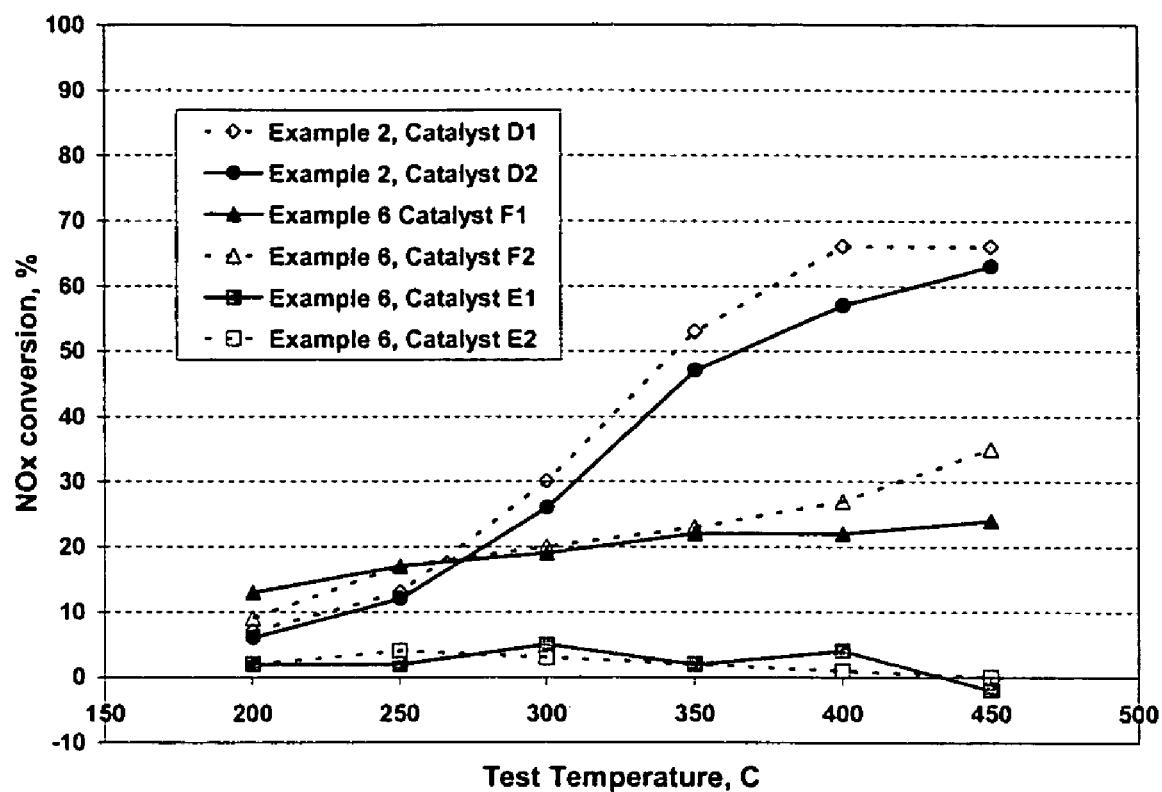

Preferably, each of the NSR and the SCR catalyst compositions are disposed on a substrate. The substrate may be any of those materials typically used for preparing catalysts, and will preferably comprise a ceramic or metal honeycomb structure. Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 300 or more gas inlet openings (i.e., cells) per square inch of cross section. FIG. 13 shows an exemplary substrate, a wallflow catalytic honeycomb filter 30, having alternately blocked channels. FIG. 14 depicts a partial sectional view showing alternately blocked channels 52. Alternate channels are plugged at the inlet with inlet plugs 58 and at the outlet with outlet plugs 60 to form opposing checkerboard patterns at the inlet 54 and outlet 56. A gas stream 62 enters through the unplugged channel inlet 64, is stopped by outlet plug 60 and diffuses through channel walls 53 to the outlet side 66. The gas cannot pass back to the inlet side walls 53 because of inlet plugs 58. The inlet side walls 53 can be coated with a porous catalyst composition.

The substrate can also be a wall-flow filter substrate, where the channels are alternately blocked, allowing a gaseous stream entering the channels from one direction (inlet direction), to flow through the channel walls and exit from the channels from the other direction (outlet direction). Either NSR and/or SCR catalyst composition can be coated on the wall-flow filter. If such substrate is utilized, the resulting system will be able to remove particulate matters along with gaseous pollutants. The wall-flow filter substrate can be made from materials commonly known in the art, such as cordierite or silicon carbide.

The ceramic substrate may be made of any suitable refractory material, e.g., cordierite, cordierite-alumina, silicon nitride, zircon mullite, spodumene, alumina-silica magnesia, zircon silicate, sillimanite, a magnesium silicate, zircon, petalite, -alumina, an aluminosilicate and the like.

The substrates useful for the catalysts of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface or the metal substrates may be oxidized at high temperatures, e.g., 1000° C. and higher, to improve the resistance to corrosion of the alloys by forming an oxide layer on the surfaces the substrates. Such high temperature-induced oxidation may enhance the adherence of the refractory metal oxide support and catalytically promoting metal components to the substrate.

In alternative embodiments, one or both of the NSR or SCR catalyst compositions may be deposited on an open cell foam substrate. Such substrates are well known in the art, and are typically formed of refractory ceramic or metallic materials.

Alternative Embodiments of the Emission Treatment System

Figure 1B:
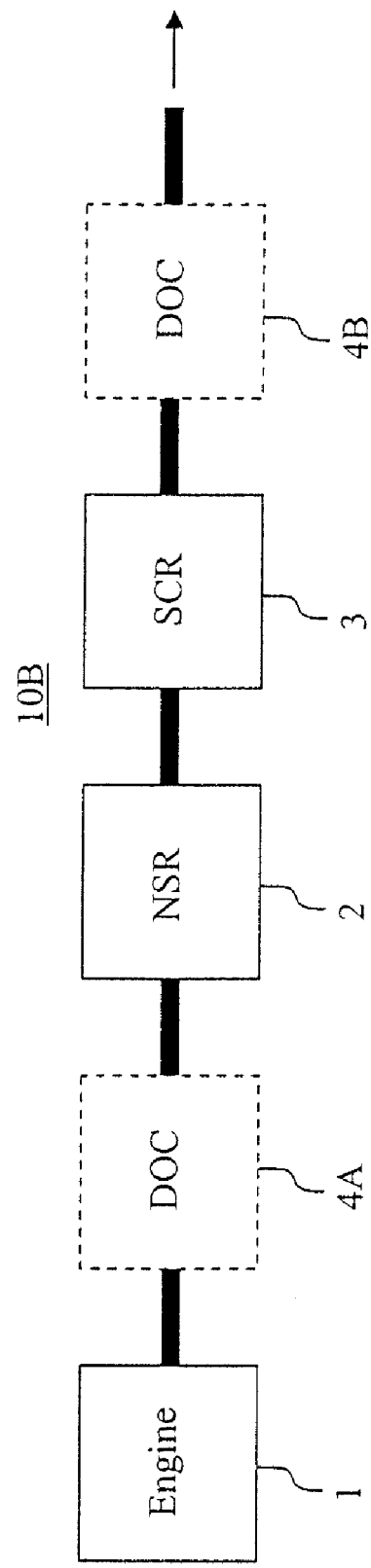
FIG. 1B is a block diagram showing one embodiment of an emissions treatment system having DOC, NSR and SCR catalysts.

While the emissions treatment system as shown in FIG. 1A can be used alone, optionally the system can contain a diesel oxidation (DOC) catalyst 4A upstream of the NSR catalyst 2 and/or downstream (as 4B) of the SCR catalyst 3 as shown in the system 10B in FIG. 1B. DOC compositions are well known in the art and may comprise base metals (e.g., ceria) and/or platinum group metals as catalytic agents.

In an upstream position (i.e., as 4A) the DOC provides several advantageous functions. The catalyst serves to oxidize unburned gaseous and non-volatile hydrocarbons (i.e., the soluble organic fraction of the diesel particulate matter) and carbon monoxide to carbon dioxide and water. Removal of substantial portions of the SOF using the DOC catalyst, in particular, assists in preventing too great a deposition of particulate matter on the NSR and SCR catalysts. In another function, a substantial proportion of the NO of the NOx component is oxidized to $NO_2$ in the oxidation catalyst. Increased proportions of $NO_2$ in the NOx component facilitate the trapping and catalytic functions of the NSR catalyst as compared to NOx mixtures containing smaller proportions of $NO_2$, as $NO_2$ is generally considered to be a more reactive species than NO.

In configurations where the DOC is located downstream of the SCR catalyst, the DOC not only serves to combust unburned hydrocarbon and CO as described above, but also serves as an ammonia slip oxidation catalyst to prevent any unreacted $NH_3$ from venting to the atmosphere, especially with DOC compositions containing platinum group metal components.

In certain embodiments of the invention, the DOC is coated on a soot filter, for example, a wall flow filter to assist in the removal of the particulate material in the exhaust stream, and, especially the soot fraction (or carbonaceous fraction) of the particulate material. The DOC, in addition to the other oxidation function mentioned above, lowers the temperature at which the soot fraction is oxidized to $CO_2$ and $H_2O$. As soot accumulates on the filter, the catalyst coating assists in the regeneration of the filter. Although the soot filter may be located downstream of the SCR catalyst it is preferred that the catalyzed soot filter be located upstream of the NSR catalyst to minimize or prevent fouling of the NSR catalyst and the SCR catalyst downstream with particulate material.

The following examples further illustrate the present invention, but of course, should not be construed as in any way limiting its scope.

EXAMPLE 1

Preparation of Catalyst Substrates (NSR Catalysts)

Catalyst A

The substrate consisted of cordierite. The bottom layer consisted of 75 g/ft³ platinum, 0.42 g/in³ BaO, 0.05 g/in³ $ZrO_2$ and 1.83 g/in³ of a support consisting of $CeO_2$-coated $Al_2O_3$. This support was prepared by the incipient wetness technique to allow 10 wt. % of $CeO_2$ on the surface of the $Al_2O_3$. The support material was impregnated with amine solubilized platinum hydroxide to achieve the desired loading. The powder was then milled, in the presence of water, such that 90% of the particles had a particle size below 10 micrometers (i.e., $d_{90}<10\mu$), thereby resulting in a high-solids slurry. During the milling process, barium acetate and zirconyl acetate dissolved in water were also added during the milling process.

The slurry of the bottom layer was then wash-coated on the cordierite substrate and the coated substrate was then dried at 110° C. for about one hour. Thereafter, the dried coated substrate was calcined by heating in a stream of flowing air at 450° C. for one hour.

The top layer slurry was then wash-coated on the surface of the bottom layer, dried at 110° C. for about one hour and thereafter calcined by heating at 450° C. for one hour. The slurry for the top layer was prepared in the same manner as that described above for the bottom layer. The top layer consisted of 65 g/ft³ platinum, 10 g/ft³ rhodium, 0.08 g/in³ BaO, 0.03 g/in³ $ZrO_2$ and 1.20 g/in³ of a support consisting of $CeO_2$-coated $Al_2O_3$ (10 wt. % $CeO_2$). The platinum and rhodium components were sequentially impregnated on the support material. The powder was then milled, in the presence of water, such that 90% of the particles had a particle size below 10 micrometers (i.e., $d_{90}<10\mu$), thereby resulting in a high-solids slurry. During the milling process, barium acetate and zirconyl acetate dissolved in water were also added during the milling process.

Catalyst B

Catalyst B is a bi-layer catalyst composite that was prepared in the following manner: The substrate was cordierite. The bottom layer consisted of 75 g/ft$^3$ platinum, 0.42 g/in$^3$ BaO, 0.05 g/in$^3$ ZrO$_2$ and 1.83 g/in$^3$ of a support consisting of TiO$_2$-coated Al$_2$O$_3$. This support was prepared by the chemical vapor deposition of 10 wt. % of TiO$_2$ on the surface of the Al$_2$O$_3$. The support material was impregnated with amine solubilized platinum hydroxide to achieve the desired loading. The powder was then milled, in the presence of water, such that 90% of the particles had a particle size below 10 micrometers (i.e., d$_{90}$ <10μ), thereby resulting in a high-solids slurry. During the milling process, solutions of barium acetate and zirconyl acetate dissolved in water were also added during the milling process.

The slurry of the bottom layer was then wash-coated on the cordierite substrate and the coated substrate was then dried at 110° C. for about one hour. Thereafter, the dried coated substrate was calcined by heating at 450° C. for one hour.

The top layer slurry was then wash-coated on the surface of the bottom layer, dried at 110° C. for about one hour and thereafter calcined by heating at 450° C. for one hour. The slurry for the top layer was prepared in the same manner as that described above for the bottom layer. The top layer consisted of 65 g/ft$^3$ platinum, 10 g/ft$^3$ rhodium, 0.08 g/in$^3$ BaO, 0.03 g/in$^3$ ZrO$_2$ and 1.20 g/in$^3$ of a support consisting of TiO$_2$-coated Al$_2$O$_3$. The platinum and rhodium components were sequentially impregnated on the support. The powder was then milled, in the presence of water, such that 90% of the particles had a particle size below 10 micrometers (i.e., d$_{90}$<10μ), thereby resulting in a high-solids slurry. During the milling process, barium acetate and zirconyl acetate dissolved in water were also added during the milling process.

Catalyst C

Catalyst C is a single-layer catalyst composite, i.e., only one layer was deposited on a cordierite substrate. This single layer was prepared in the same manner as described above for the layers for Catalyst A. The single layer consisted of 150 g/ft$^3$ platinum, 0.40 g/in$^3$ BaO, 0.2 g/in$^3$ Fe$_2$O$_3$ and 2.4 g/in$^3$ of Al$_2$O$_3$ support. The composite was prepared by sequential impregnation of the support using iron nitrate, barium acetate and amine solubilized platinum hydroxide.

Lean Aging Conditions for Catalyst A, B and C

Lean aging of the catalysts was conducted by exposing the catalyst to a stream of air/steam (10% steam) at an inlet temperature of 700° C. for 4 hours with a gas hourly space velocity of 30,000 h$^{-1}$.

EXAMPLE 2

Performance Testing for Emissions Treatment Systems Having Catalyst A as an NSR Catalyst, Performance as a Function of CO Concentration in a Rich Feed In this example, the NOx conversion, NH$_3$ and N$_2$ formation were determined as a function of the CO concentration in the rich pulse (i.e., in the rich gaseous stream). These determinations were first conducted with a system having in serial arrangement Catalyst A as the upstream substrate and a blank flow through monolith substrate as the downstream substrate. This system is referred to herein as "System I."

A second system that was evaluated had in a serial arrangement, Catalyst A as the upstream substrate and SCR Catalyst D as the downstream substrate, which is referred to herein as "System II." SCR catalyst D contained a catalyst composition with 1.8 g/in$^3$ iron exchanged Beta zeolite with 4 wt. % ZrO$_2$ binder that was coated onto a flow through monolith substrate.

Performance tests were conducted with an alternating lean and rich feed, with 50 seconds lean period and 5 seconds rich period. The lean feed consisted of 10% O$_2$, 10% H$_2$O, 5% CO$_2$ and 200 ppm NO. The rich feed consisted of 0.8% HC (as C$_3$H$_6$), 1% O$_2$, 10% H$_2$O, 5% CO2, 200 ppm NO and alternately, 0.5, 1, 2, 3 or 4% CO. The systems were evaluated at temperatures of 200, 250, 300, 350 and 450° C. with a GHSV of 60,000 h$^{-1}$. Once the performance stabilized at a given temperature, data were collected for a period of 10 minutes. NO and NO$_2$ concentrations (and therefore NOx concentration) and NH$_3$ formation were determined by Fourier transform infrared spectroscopy (FTIR). N$_2$ formation was determined by calculation as the remaining nitrogen species. The NOx concentrations downstream of the catalyst were compared with those upstream of the system. The relative disappearance of NOx concentration, formation of NH$_3$ and N$_2$ were expressed in percentage, were calculated throughout the data collection period at the rate of 1/second.

Figure 2:
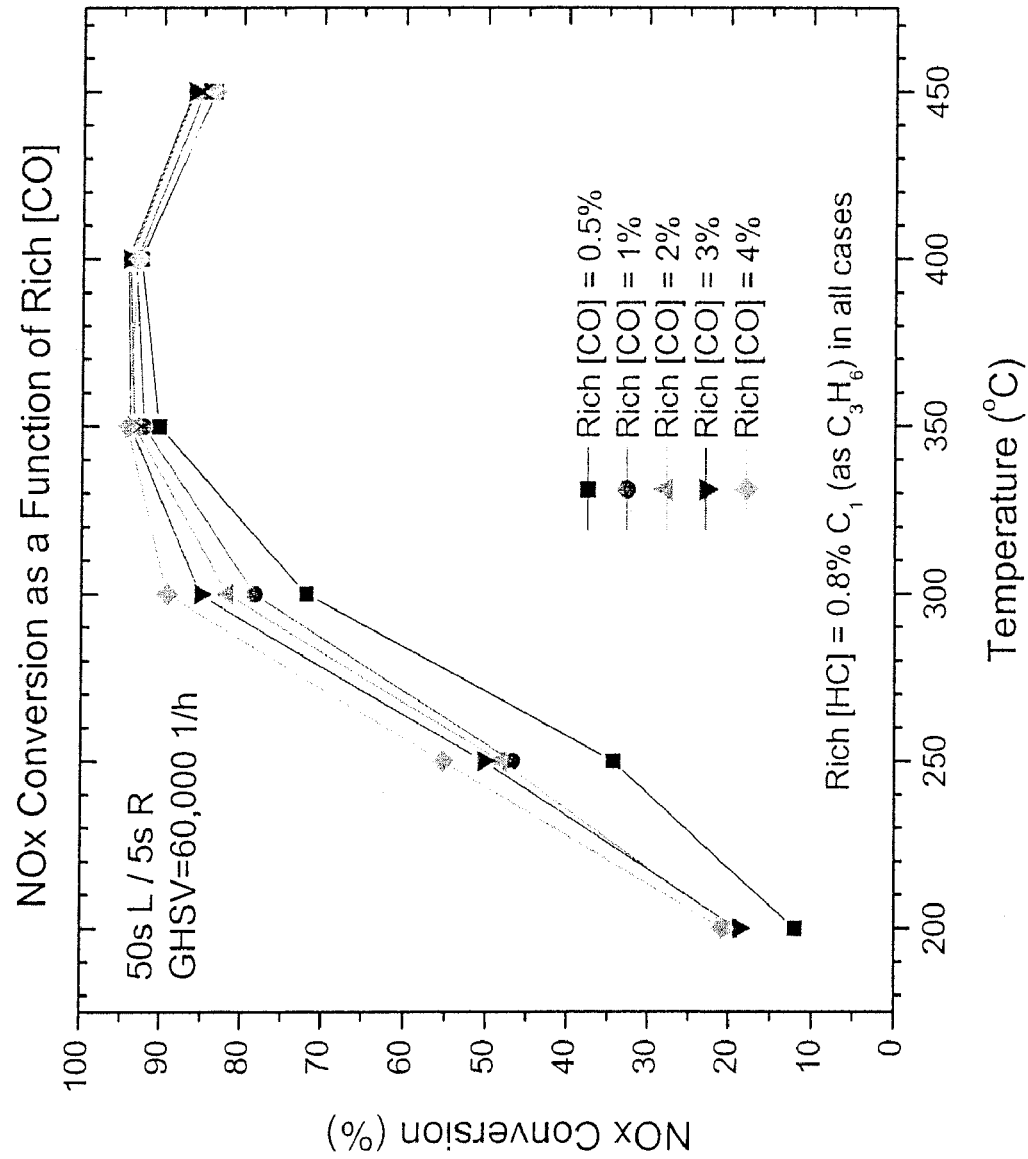
FIG. 2 shows the total NOx conversion on System I as a function of CO concentration in a rich pulse.
Figure 3:
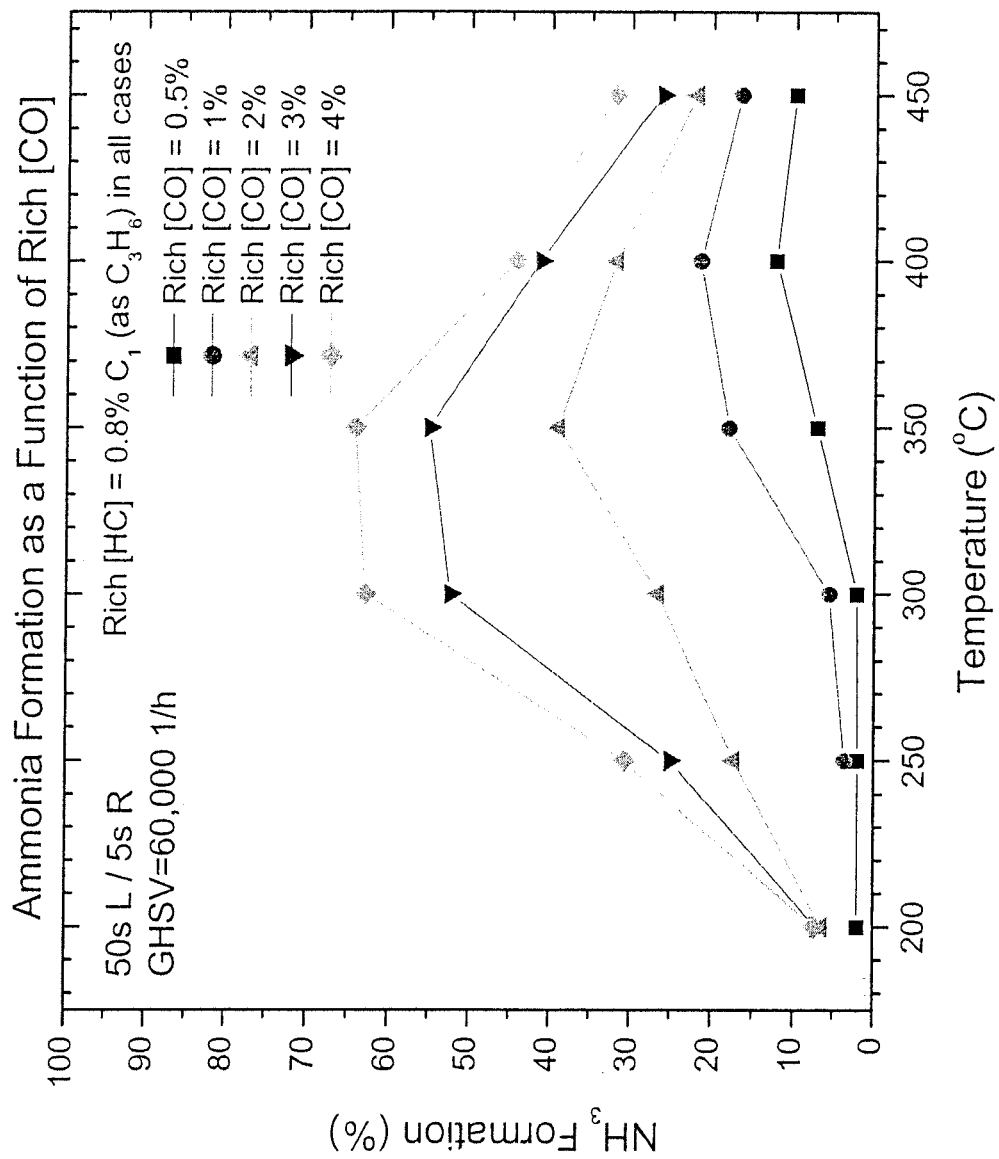
FIG. 3 shows the $NH_3$ formation on System I as a function of CO concentration in a rich pulse.
Figure 4:
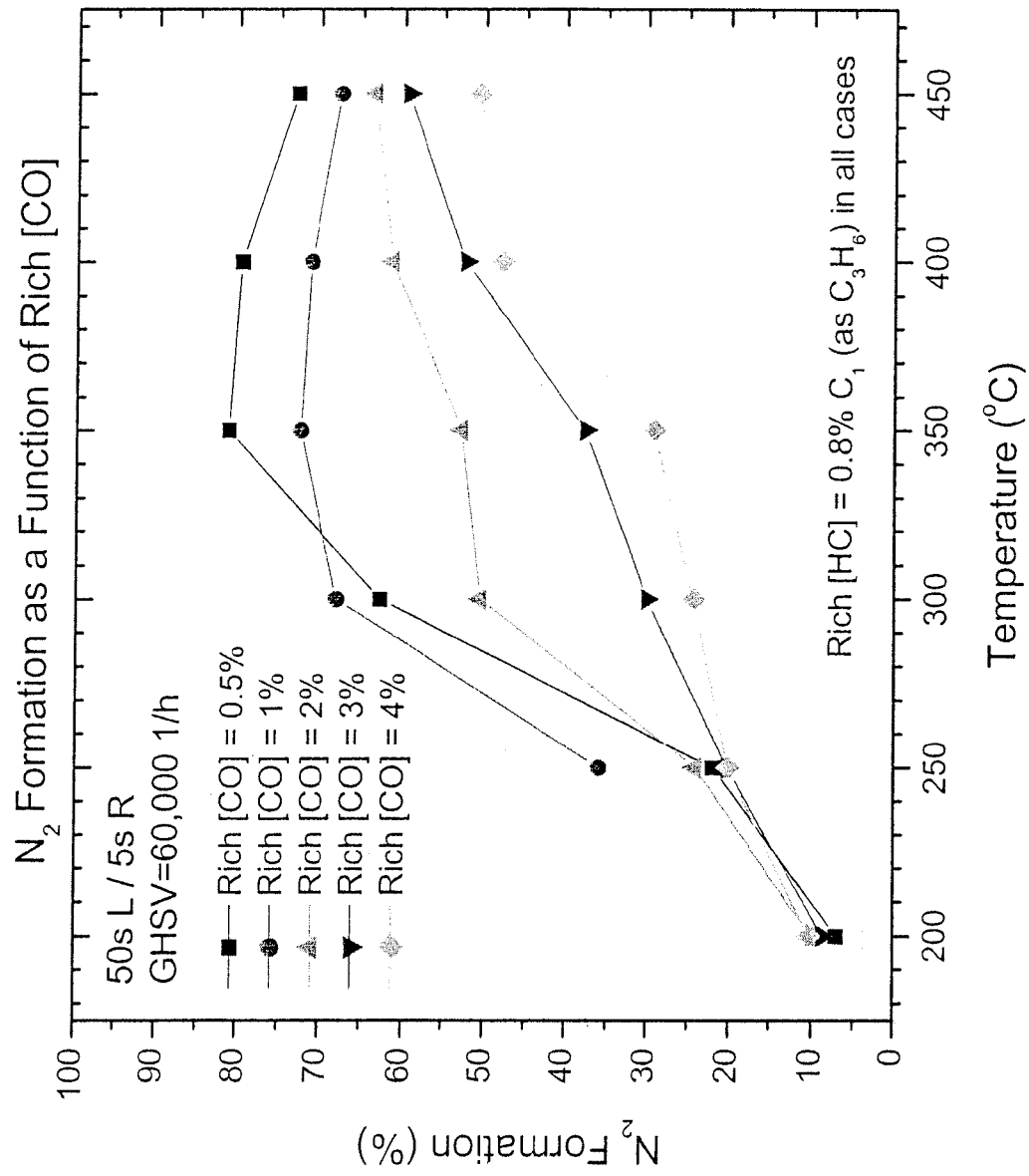
FIG. 4 shows the $N_2$ formation on System I as a function of CO concentration in a rich pulse.
Figure 5:
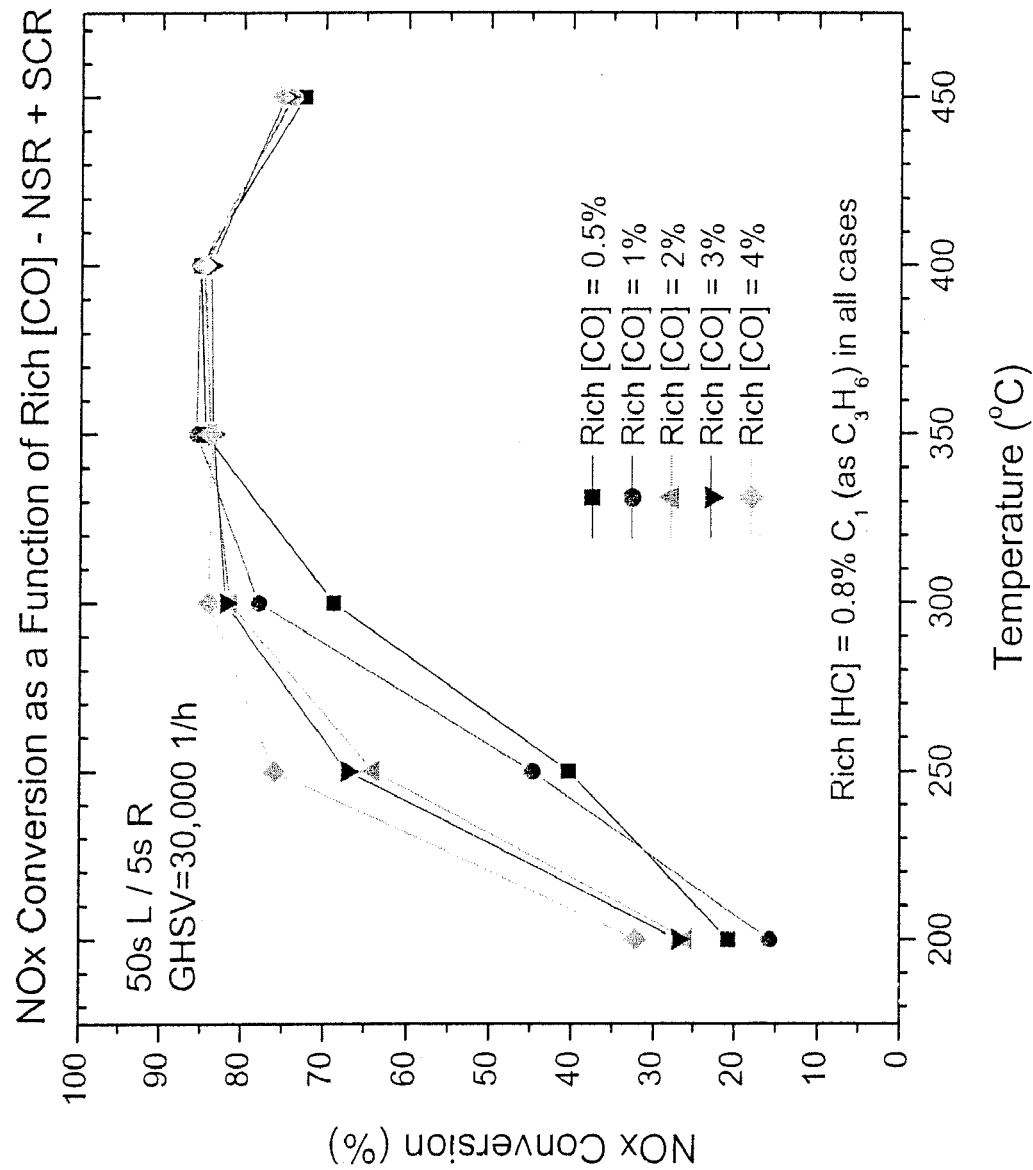
FIG. 5 shows the total NOx conversion on System II as a function of CO concentration in a rich pulse.
Figure 6:
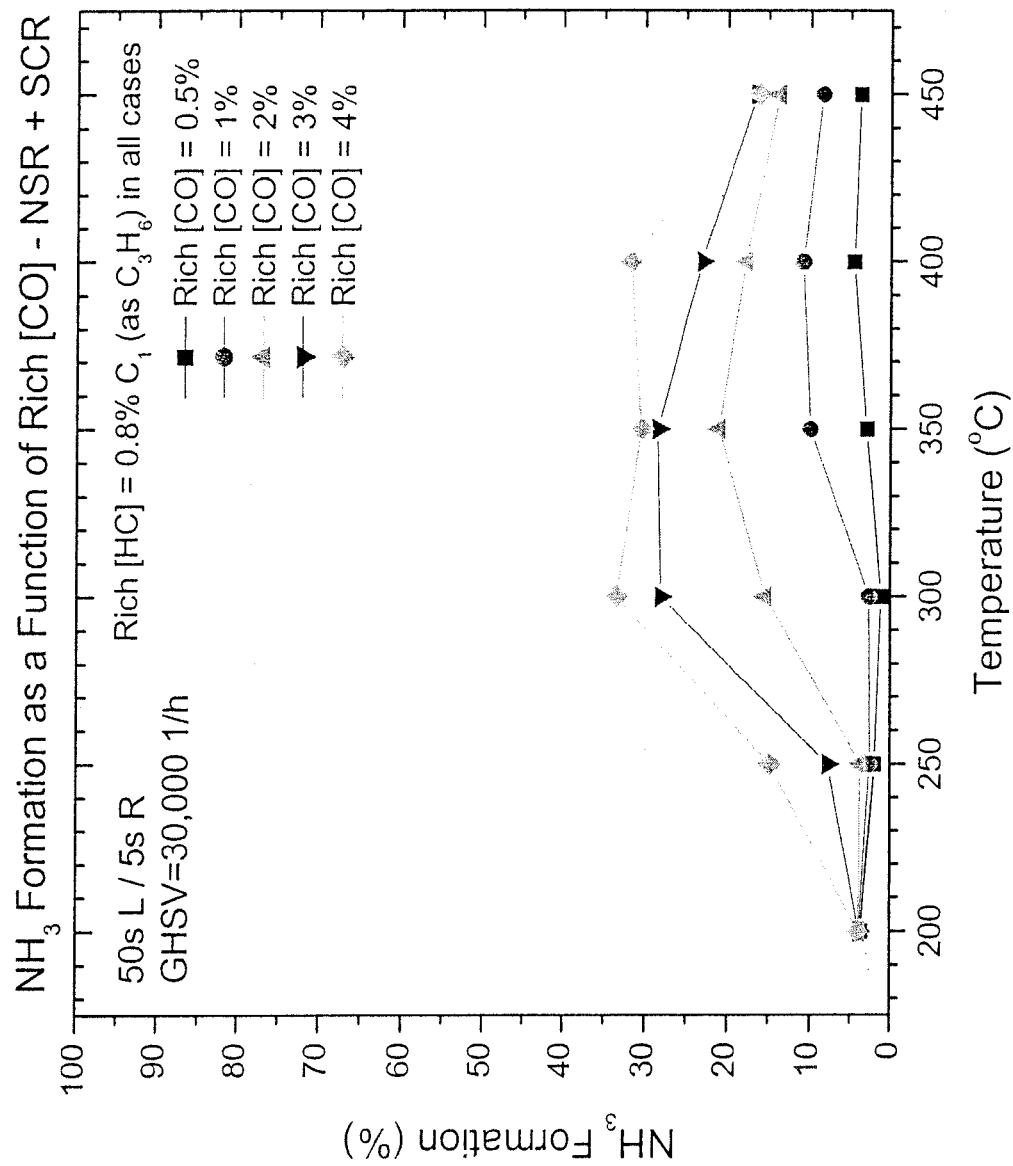
FIG. 6 shows the $NH_3$ formation on System II as a function of CO concentration in a rich pulse.
Figure 7:
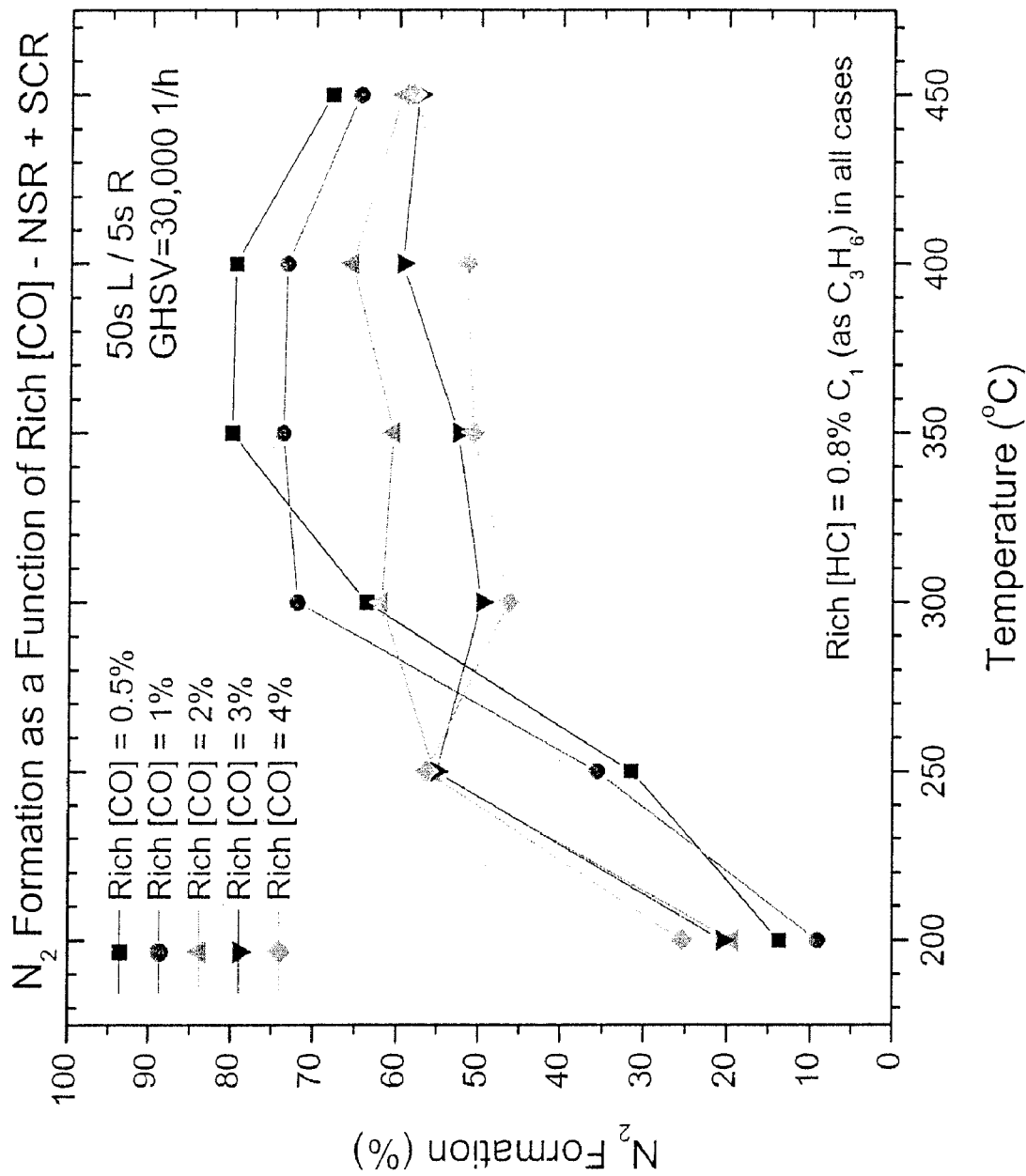
FIG. 7 shows the $N_2$ formation on System II as a function of CO concentration in a rich pulse.

The instantaneous NOx conversions, NH$_3$ formation and N$_2$ formation were then averaged and plotted against the catalyst inlet temperature, resulting in the graphs in FIGS. 2-4 for System I, and FIGS. 5-7 for System II. As can be seen by comparing FIGS. 2 and 5 the total NOx conversion is higher for System II than system I when the rich feed contains 2% or higher CO at inlet temperatures below 300° C. As can be seen for both Systems I and II the concentration of the NH$_3$ produced was proportional to the concentration of CO in the rich feed. The NH$_3$ breakthrough at the outlet of System II is much lower than that of System I at any rich CO level (FIGS. 3 and 6). This suggests that a part of the NH$_3$ produced over the NSR catalyst is consumed on the downstream SCR catalyst. As shown in FIGS. 4 and 7, the NH$_3$ consumption over the SCR catalyst contributes to the additional N$_2$ formed. Only N$_2$ formation is considered true NOx reduction. When the rich CO concentration is higher than 2%, the N$_2$ formation over System II is much higher compared to those of System I throughout the temperature range. This effect is especially pronounced at low temperatures, <300° C., which makes this system very appealing for light-duty diesel applications where the exhaust temperature is typically low.

EXAMPLE 3

Performance Testing for Emissions Treatment Systems Having Catalyst A as an NSR Catalyst; Performance as a Function of Rich Feed Timing In this example, the NOx conversion, NH$_3$ and N$_2$ formation were determined as a function of the rich feed timing. These determinations were first conducted with both System I and System II. System I and II are described in Example 2.

Performance tests were conducted with an alternating lean and rich feed. The lean feed consisted of 10% O$_2$, 10% H$_2$O, 5% CO$_2$ and 200 ppm NO. The rich feed consisted of 0.8% HC (as C$_3$H$_6$), 1% O$_2$, 10% H$_2$O, 5% CO$_2$, 200 ppm NO and 4% CO. The systems were evaluated at temperatures of 200, 250, 300, 350 and 450° C. with a GHSV of 60,000 h$^{-1}$. In this test, the length of the rich pulse (rich period) was 1, 3 or 5 seconds while the lean period was always 50 seconds. Once the performance stabilized at a given temperature, data were collected for a period of 10 minutes. NO and NO$_2$ concentrations (and therefore NOx concentration) and NH$_3$ formation were determined by FTIR spectroscopy. N$_2$ formation was determined by calculation as the remaining nitrogen species.

The NOx concentrations downstream of the catalyst were compared with those upstream of the system. The relative disappearance of NOx concentration, formation of $NH_3$ and $N_2$ were expressed in percentage, were calculated throughout the data collection period at the rate of 1/second.

The instantaneous NOx conversions, $NH_3$ formation and $N_2$ formation were then averaged and plotted against the catalyst inlet temperature.

Figure 8:
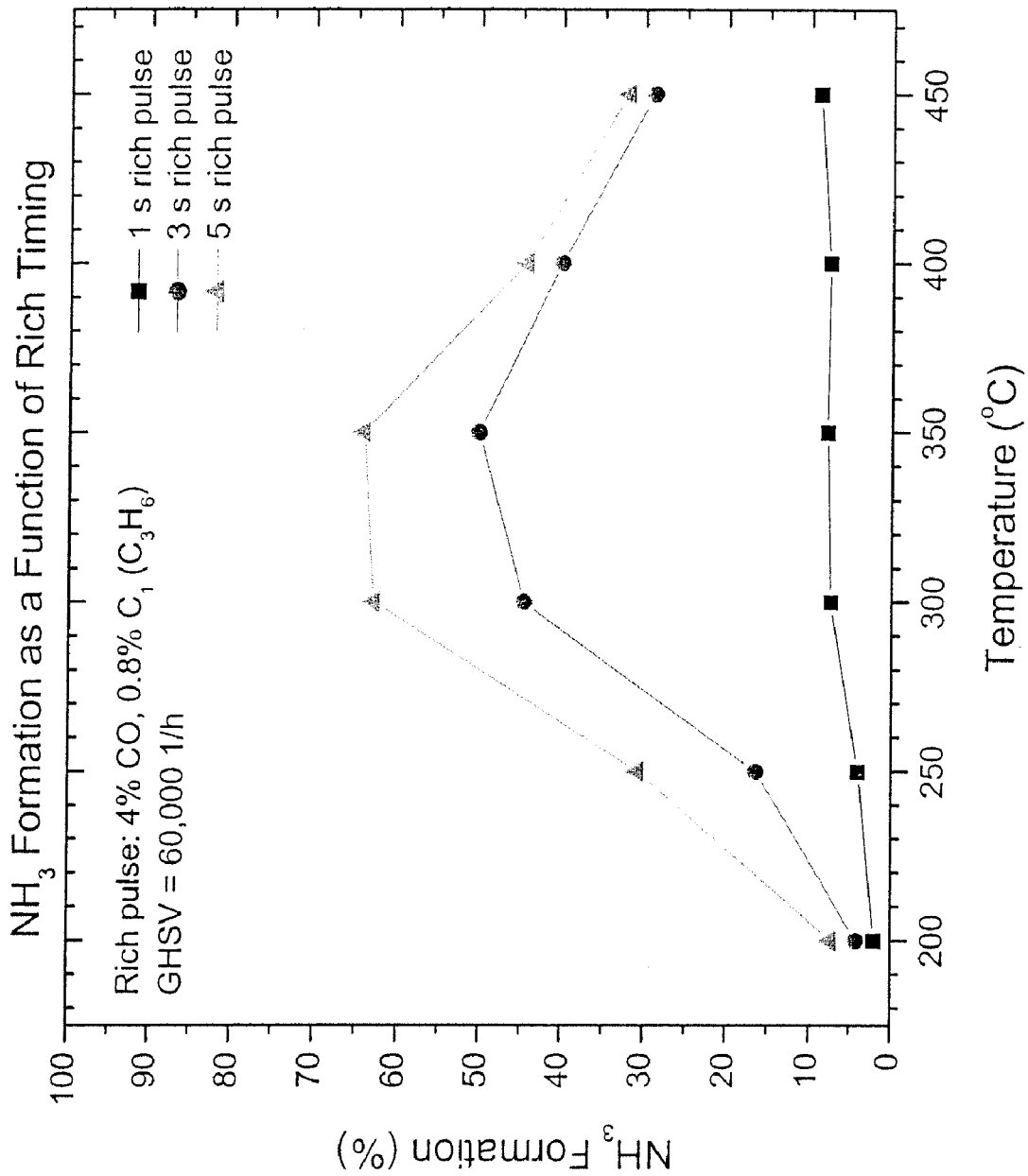
FIG. 8 shows the $NH_3$ formation on System I as a function of rich timing.
Figure 9:
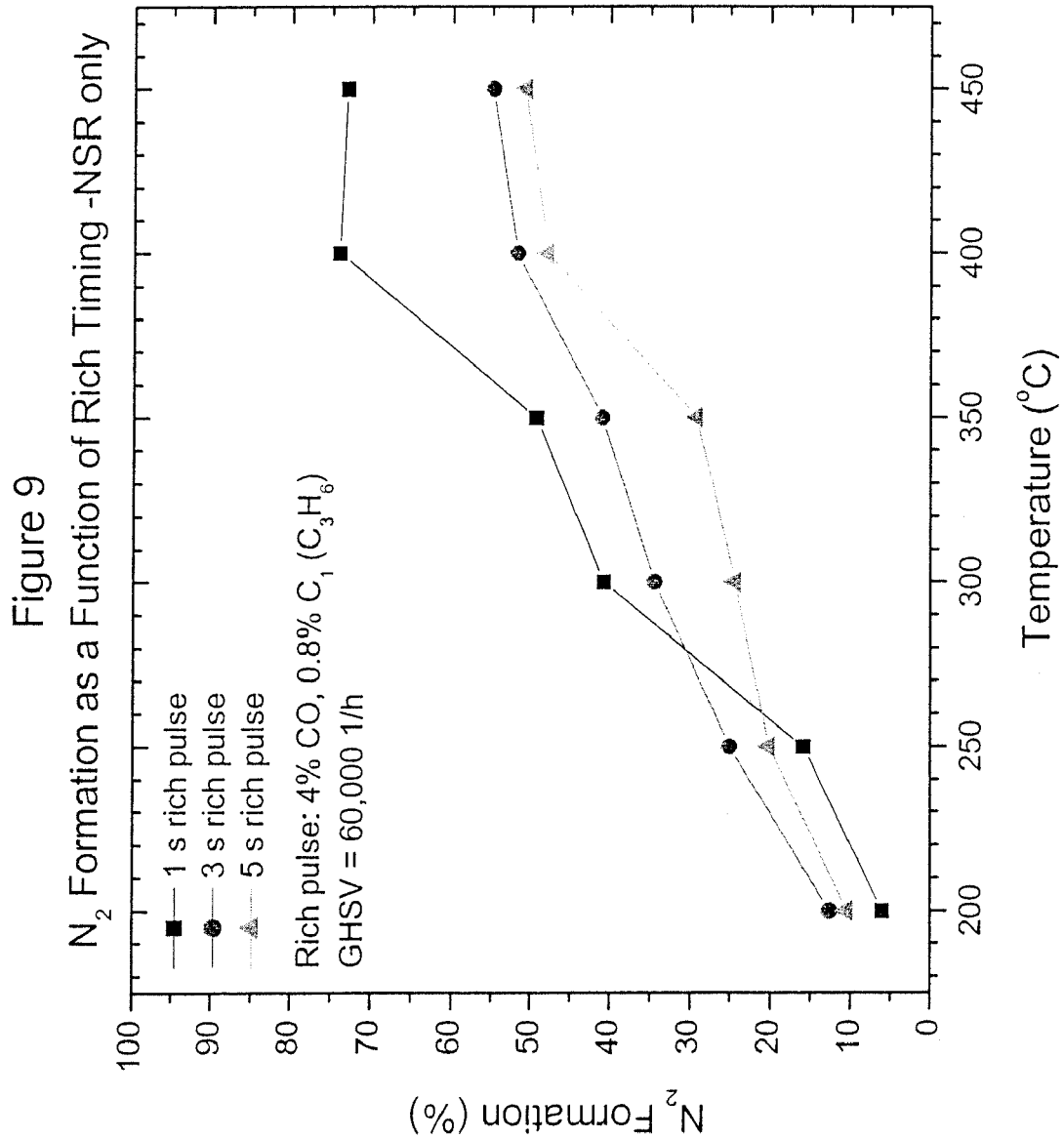
FIG. 9 shows the $N_2$ formation on System I as a function of rich timing.
Figure 10:
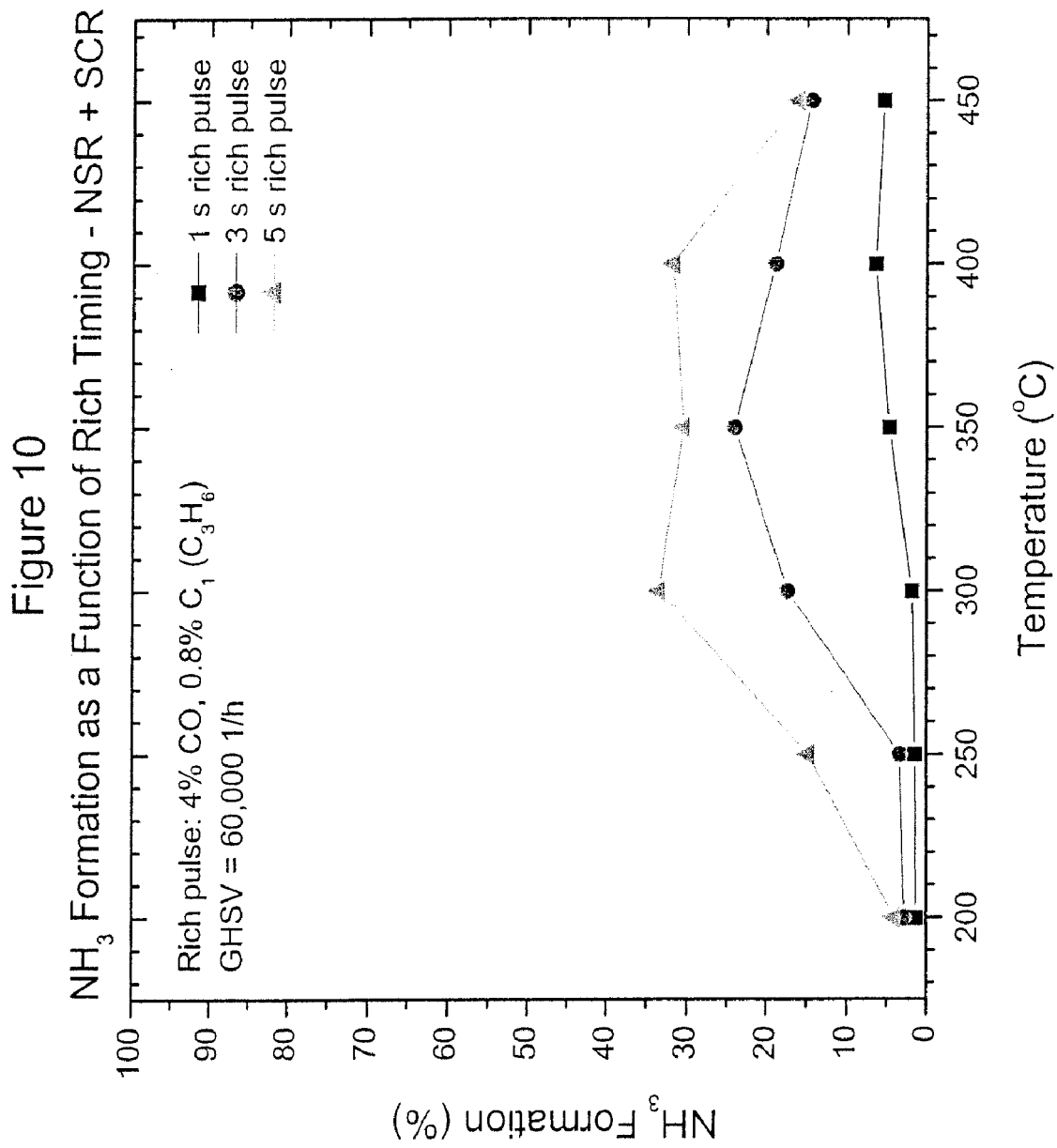
FIG. 10 shows the $NH_3$ formation on System II as a function of rich timing.
Figure 11:
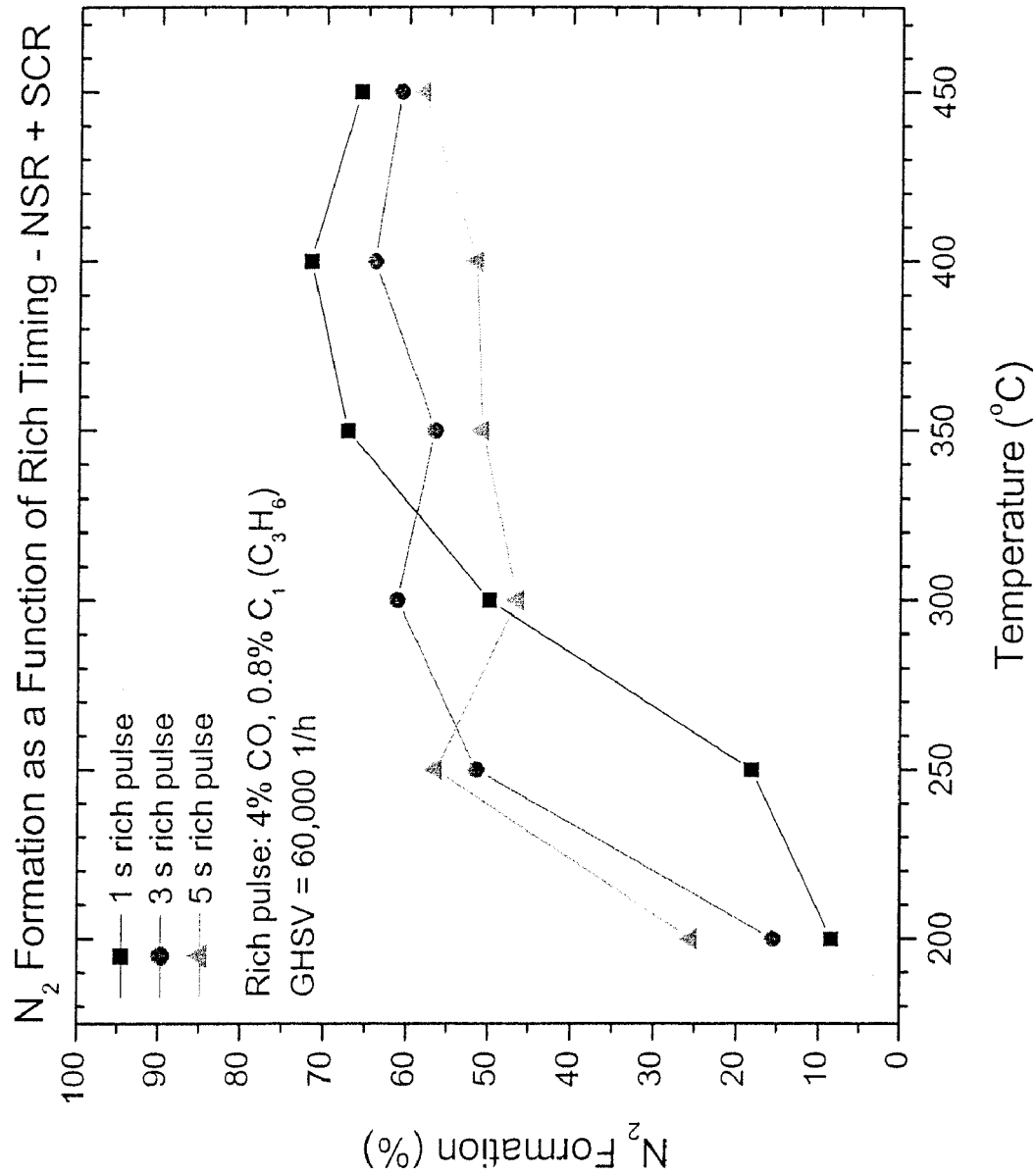
FIG. 11 shows the $N_2$ formation on System II as a function of rich timing.

Increasing rich timing has a similar effect to increasing the rich pulse CO concentration. The total NOx conversion increases with increasing rich timing for both System I and System II. However, the NOx conversion over system II is higher than that of System I at <300° C. A more striking comparison can be made between the $NH_3$ formed at the outlet of the systems. The $NH_3$ formation over System I is more than twice of that over System II at all rich timing (see FIGS. 8 and 10). Again, this indicates that System II consumes $NH_3$ for the SCR reaction. This is evidenced by that fact that the $N_2$ formed by System II is much higher than that of System I at all rich timings (see FIGS. 9 and 11). For example, the $N_2$ formation is 57% over System II at 250° C. with 5 s rich while that for System I is only 20% under identical conditions.

EXAMPLE 4

Performance Testing for Emissions Treatment Systems Having Catalyst A as an NSR Catalyst; Performance with a Rich Feed Near the Stoichiometric Point In this example, the NOx conversion, $NH_3$ and $N_2$ formation were determined with a rich feed that was near the stoichiometric point. These determinations were conducted with both System I and II, which systems are described in Example 2.

Performance tests were conducted with an alternating lean and rich feed with 50 seconds lean period and 5 seconds rich period. The lean feed consisted of 10% $O_2$, 10% $H_2O$, 5% $CO_2$ and 200 ppm NO. The rich feed consisted of 1% $O_2$, 10% $H_2O$, 5% $CO_2$, 200 ppm NO and 2% CO. The λ for the rich feed was 1.0 (This feed is, in fact, not rich by definition, but is only rich relative to the lean feed used in this experiment.). The systems were evaluated at temperatures of 200, 250, 300, 350 and 450° C. with a GHSV of 60,000 $h^{-1}$. Once the performance stabilized at a given temperature, data were collected for a period of 10 minutes. NO and $NO_2$ concentrations (and therefore NOx concentration) and $NH_3$ formation were determined by FTIR spectroscopy. $N_2$ formation was determined by calculation as the remaining nitrogen species. The NOx concentrations downstream of the catalyst were compared with those upstream of the system. The relative disappearance of NOx concentration, formation of $NH_3$ and $N_2$ were expressed in percentage, were calculated throughout the data collection period at the rate of 1/second.

We have found that when the λ value in a rich pulse was 1.0, no $NH_3$ was formed on either system. Therefore, a necessary condition for $NH_3$ formation is the presence of rich environment. As a consequence, there is no appreciable difference between these two systems in NOx conversion, $N_2$ or $NH_3$ formation.

EXAMPLE 5

Comparative Performance Testing for NSR Catalysts; NOx Conversion and $NH_3$ Formation with Catalysts A, B and C In this example, $NH_3$ formation was compared among three NSR catalysts, Catalysts A, B and C, under identical test conditions. Performance tests were conducted with an alternating lean and rich feed with 50 seconds lean period and 5 seconds rich period. The lean feed consisted of 10% $O_2$, 10% $H_2O$, 5% $CO_2$ and 500 ppm NO. The rich feed consisted of 1% $O_2$, 10% $H_2O$, 5% $CO_2$, 500 ppm NO and 4% CO. The λ for the rich feed was about 0.94 The systems were evaluated at temperatures of 200, 250, 300, 350 and 450° C. with a GHSV of 30,000 $h^{-1}$. Once the performance stabilized at a given temperature, data were collected for a period of 10 minutes. NO and $NO_2$ concentrations (and therefore NOx concentration) and $NH_3$ formation were determined by Fourier transform infrared spectroscopy (FTIR). The NOx concentrations downstream of the catalyst were compared with those upstream of the system. The relative disappearance of NOx, formation of $NH_3$ and $N_2$ were expressed in percentage, were calculated throughout the data collection period at the rate of 1/second.

Figure 12:
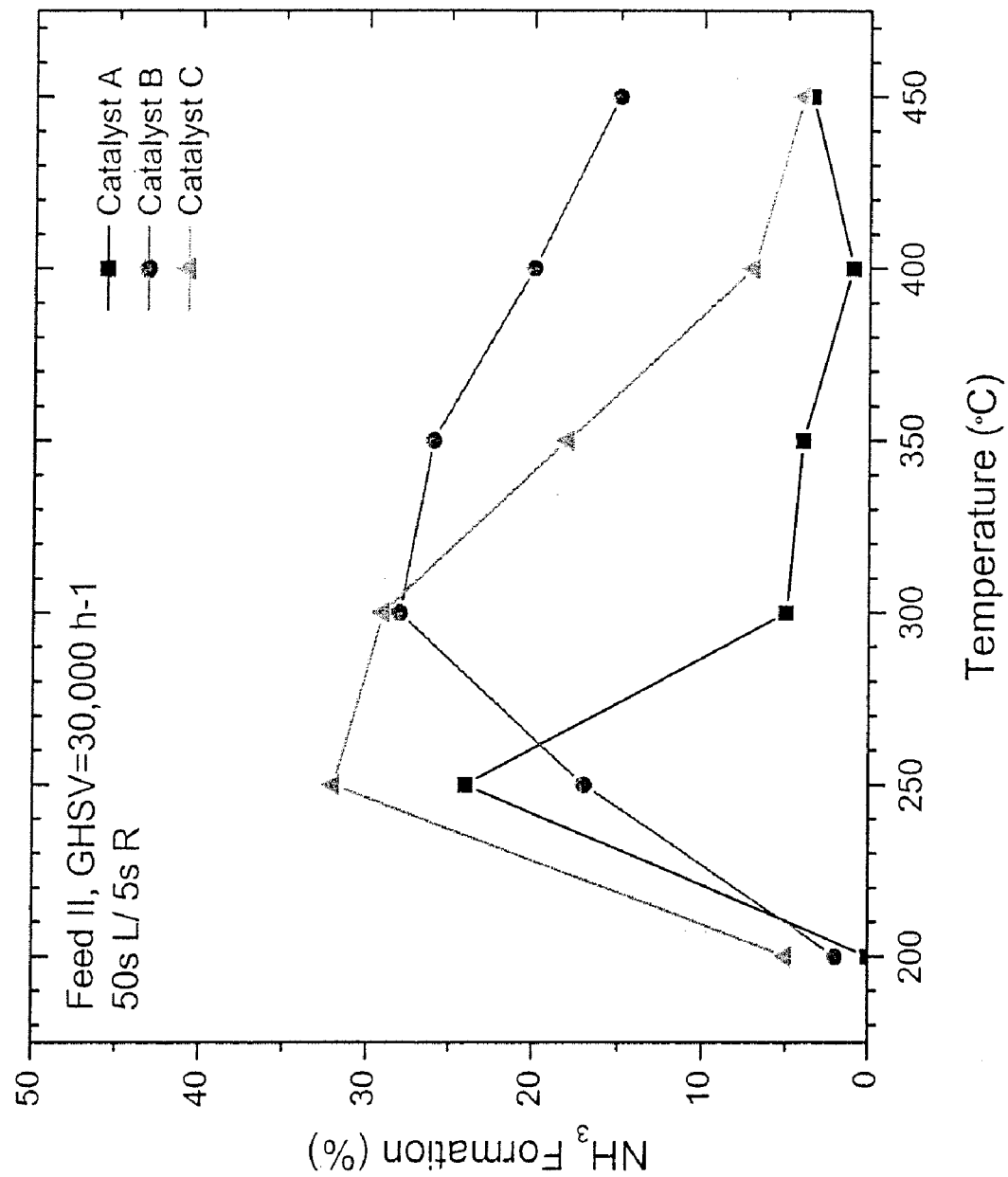
FIG. 12 shows the $NH_3$ formation over three NSR catalysts, Catalysts A, B and C.

The instantaneous $NH_3$ formation was then averaged and plotted against the catalyst inlet temperature, resulting in the graph in FIG. 12. As can be seen in the figure, the $NH_3$ formation is higher for Catalyst C at temperatures below 300° C., and Catalyst B-produces more $NH_3$ at >300° C. Catalyst A forms the lowest level of $NH_3$, which centers at 250° C. It appears that the oxygen storage component present in Catalyst A, comparing to Catalyst B, reduces the $NH_3$ formation at high temperatures. Presumably, the oxygen storage component becomes reactive at high temperatures and oxidizes the $NH_3$ formed to NO and possibly to other N-containing species. It is also apparent that iron oxide component present in Catalyst C promotes $NH_3$ formation.

While this invention has been described with an emphasis upon preferred embodiments, it will be obvious to those of ordinary skill in the art that variations in the preferred devices and methods may be used and that it is intended that the invention may be practiced otherwise than as specifically described herein. Accordingly, this invention includes all modifications encompassed within the spirit and scope of the invention as defined by the claims that follow.

What is claimed:

1. A method for converting NOx in an exhaust gas from a diesel engine or lean burn gasoline engine to $N_2$, comprising:
   (a) contacting the exhaust gas comprising NOx in a lean period with a NOx storage reduction (NSR) catalyst comprising a platinum group metal component and at least 0.1 g/$in^3$ of a NOx sorbent, selected from the group consisting essentially of alkali and alkaline earth metal oxides dispersed on a refractory metal oxide to sorb a portion of NOx in the form of alkaline earth metal nitrate from the exhaust gas and allowing a portion of the NOx to flow through the NSR catalyst untreated;
   (b) periodically altering the air/fuel ratio of the exhaust stream to provide a rich gaseous stream during a rich period;
   (c) contacting the rich gaseous stream with the NSR catalyst to reduce the sorbed NOx to $NH_3$; and, (d) subsequently contacting a mixture of the $NH_3$ and the untreated NOx in the exhaust gas with an SCR catalyst to form $N_2$, wherein the NSR further comprises an oxygen storage component selected from one or more oxides of cerium and praseodymium in an amount less than 0.5 g/in$^3$.

2. The method of claim 1, wherein the SCR catalyst is located on a filter.

3. The method of claim 2, wherein the NSR catalyst is located on the same filter upstream of the SCR catalyst.

4. The method of claim 1, wherein the NSR catalyst comprises at least 0.05 g/in$^3$ of an oxygen storage component.

5. The method of claim 1, further comprising step (c1), following step (c), wherein step (c1) comprises sorbing a portion of the $NH_3$ on the SCR catalyst.

6. The method of claim 1, wherein the alteration of the air/fuel ratio of the exhaust gas stream in (b), comprises injecting a reducing agent selected from at least one of a hydrocarbon fuel, carbon monoxide and hydrogen into the exhaust gas upstream of the NSR catalyst.

7. The method of claim 1, wherein the exhaust gas of (a) has a space velocity of 10,000 to 200,000 h$^{-1}$ through the NSR catalyst.

8. The method of claim 1, wherein the exhaust gas of (d) has a space velocity of 10,000 to 200,000 h$^{-1}$ through the SCR catalyst.

9. The method of claim 1, wherein the $\lambda$ of the rich gaseous stream is from 0.80 to 0.995.

10. The method of claim 1, wherein the $\lambda$ of the exhaust gas during lean period is greater than 1.1.

11. The method of claim 1, wherein the rich period is from 1 to 50% of the lean period.

12. The method of claim 1, wherein the exhaust gas of (a) has a temperature of 100 to 6000° C.

* * * * *